(12) United States Patent
Nagai

(10) Patent No.: US 10,933,333 B2
(45) Date of Patent: *Mar. 2, 2021

(54) SYSTEM FOR ESTABLISHING A SUPPORT HIERARCHY FOR A PLAYER IN A COMPETITIVE GAME

(71) Applicant: GREE, Inc., Tokyo (JP)

(72) Inventor: Junnosuke Nagai, Tokyo (JP)

(73) Assignee: GREE, Inc., Tokyo (JP)

(*) Notice: Subject to any disclaimer, the term of this patent is extended or adjusted under 35 U.S.C. 154(b) by 44 days.

This patent is subject to a terminal disclaimer.

(21) Appl. No.: 16/531,260

(22) Filed: Aug. 5, 2019

(65) Prior Publication Data

US 2019/0351333 A1  Nov. 21, 2019

Related U.S. Application Data

(63) Continuation of application No. 15/855,187, filed on Dec. 27, 2017, now Pat. No. 10,413,834.

(30) Foreign Application Priority Data

Dec. 28, 2016  (JP) .................................. 2016-257035

(51) Int. Cl.
    *A63F 13/795*  (2014.01)
    *A63F 13/798*  (2014.01)
    (Continued)

(52) U.S. Cl.
    CPC .......... *A63F 13/795* (2014.09); *A63F 13/798* (2014.09); *A63F 13/92* (2014.09); *A63F 13/35* (2014.09)

(58) Field of Classification Search
    None
    See application file for complete search history.

(56) References Cited

U.S. PATENT DOCUMENTS

2012/0231888 A1* 9/2012 Abe ...................... H04L 67/38
                                                              463/42

FOREIGN PATENT DOCUMENTS

JP      2013-208144 A    10/2013
JP       2014-8109 A     1/2014
(Continued)

OTHER PUBLICATIONS

Japanese Office Action dated Jul. 14, 2020 in corresponding application No. 2019-120432; 8 pgs.

(Continued)

*Primary Examiner* — Robert T Clarke, Jr.
(74) *Attorney, Agent, or Firm* — Maier & Maier, PLLC

(57) ABSTRACT

A control program which may cause a game apparatus to implement: a match execution function for executing a match between a plurality of players; a setting function for setting a first player who wins as a superior player to which a second player who loses is subordinate on the basis of a result of execution of the match and setting a subordination rank of the second player; and a control function for performing control such that at least a part of executable actions are different depending on a setting of the setting function, wherein, in a case where a player is subordinate to the first player, the setting function is implemented to set a subordination rank of the second player on the basis of the subordination rank of the player subordinate to the superior player.

16 Claims, 16 Drawing Sheets

(51) Int. Cl.
    *A63F 13/92*     (2014.01)
    *A63F 13/35*     (2014.01)

(56)         References Cited

FOREIGN PATENT DOCUMENTS

| | | |
|---|---|---|
| JP | 2015-16260 A | 1/2015 |
| JP | 2015-171454 A | 10/2015 |
| JP | 2016-190000 A | 11/2016 |

OTHER PUBLICATIONS

Janken Train, Mixed Juichu, 2016 : [online][search on Mar. 17, 2017] URL, https://web.archive.org/web/20160729161121/http://45mix.net/en/janken-train/.
Office Action dated Aug. 28, 2018 in corresponding Japanese application No. JP2017-091929; 7 pgs.
Office Action dated Jan. 8, 2019 in corresponding Japanese Application No. JP2017-091929; 7 pages.
Office Action dated May 22, 2018 in corresponding Japanese application No. JP2017-091929; 14 pgs.
"Samurai & Dragons Hao Training Guide First Edition SAMURAI & DRAGONS", Enterbrain Corporation, Published: Apr. 12, 2013, 1st Edition, p. 11-13, 16 pgs.

\* cited by examiner

FIG. 12A

| PLAYER ID | PLAYER NAME | ATTACK POINT | DEFENSE POINT | HP (CURRENT HP, MAXIMUM HP) | AP (CURRENT AP, MAXIMUM AP) | ... |
|---|---|---|---|---|---|---|
| P000001 | □□□ | 48428 | 48156 | (700, 18700) | (50, 100) | ... |
| P000002 | ××× | 11225 | 35874 | (2600, 9900) | (120, 120) | ... |
| ... | ... | ... | ... | ... | ... | ... |

FIG. 12B

| GROUP ID | GROUP NAME | AFFILIATED PLAYER | OBTAINED DP | NUMBER OF OWNED AP RECOVERY ITEMS | ... |
|---|---|---|---|---|---|
| G001 | ○○ GUILD | (P000001, P000032, ...) | 21540 | 200 | ... |
| G002 | △△ GUILD | (P000208, P000068, ...) | 8780 | 120 | ... |
| ... | ... | ... | ... | ... | ... |

FIG.13A

| GROUP ID | SUPERIOR GROUP ID | RANK IN SUBORDINATE GROUP | ... |
|---|---|---|---|
| G001 | G001 | 1 | ... |
| G002 | G006 | 2 | ... |
| G003 | G001 | 2 | ... |
| G004 | G006 | 3 | ... |
| G005 | G001 | 3 | ... |
| G006 | G006 | 1 | ... |
| ... | ... | ... | ... |

FIG.13B

| PERIOD ID | GAME EXECUTION PERIOD (START DATE/TIME, END DATE/TIME) | MATCH INFORMATION | ... |
|---|---|---|---|
| B01 | (OCT 10, 21:00, OCT 10, 21:59) | (G001,G003), (G002,G006), ... | ... |
| B02 | (OCT 11, 21:00, OCT 11, 21:59) | – | ... |
| ... | ... | ... | ... |

SYSTEM FOR ESTABLISHING A SUPPORT HIERARCHY FOR A PLAYER IN A COMPETITIVE GAME

CLAIM OF PRIORITY

This application claims priority from U.S. patent application Ser. No. 15/855,187, filed on Dec. 27, 2017, entitled "SYSTEM FOR ESTABLISHING A SUPPORT HIERARCHY FOR A PLAYER IN A COMPETITIVE GAME," which in turn claims priority from Japanese Patent Application No. 2016-257035, filed on Dec. 28, 2016, the entire contents of which are hereby incorporated by reference.

FIELD

Exemplary embodiments described herein relate to a control program, a control method, and a game apparatus.

BACKGROUND

In the related art, there is known a game system that provides a battle game in which a match is performed between players or between groups to which a plurality of players belong. In such a battle game, a match event may be performed such that one player or one group is ultimately determined to be the winner by a tournament method.

For example, JP-A-2015-171454 discloses a game system capable of providing a battle game for a match between a group to which a player belongs and another group, in which a player belonging to a group not participating in the match can watch the match being executed. In this game system, a player who cannot participate in the subsequent battle game because he/she lost the battle game in a tournament-based match event is allowed to recognize a progress of the battle game during the match event.

However, in the game system of the related art, such a player who has lost the battle game is not allowed to participate in the match in the match event and can only watch the match. Therefore, when a player loses the battle game in the match event, the player sometimes loses interest in the match event.

SUMMARY

In view of the aforementioned problems, according to an exemplary embodiment, a control program, a control method, and a game apparatus may be provided that are capable of allowing a player who does not participate in a game, an event, or the like to get involved in the game, the event, or the like and enhancing a player's interest in the game.

According to an exemplary embodiment, there may be provided a control program of a game apparatus provided with a memory unit to provide a game for executing a match between players, the control program allowing the game apparatus to implement: a memory function for storing a plurality of players in the memory unit; a match execution function for executing a match between a plurality of players; a setting function for setting a first player who wins as a superior player to which a second player who loses may be subordinate on the basis of a result of execution of the match and setting a subordination rank of the second player; and a control function for performing control such that at least a part of executable actions may be different depending on a setting of the setting function, wherein, in a case where a player is subordinate to the first player, the setting function may be implemented to set a subordination rank of the second player on the basis of the subordination rank of the player subordinate to the superior player.

In the control program described above, according to an exemplary embodiment, the action executable in a case where the superior player may be set may include changing a parameter set for the superior player on the basis of the action.

In the control program described above, according to an exemplary embodiment, the game apparatus may implement a point memory function for storing each of the plurality of players in the memory unit in association with a second point for recovering a first point consumed in the match, and the action for changing the parameter set for the superior player may be an action for instructing to associate the second point associated with a player subordinate to the superior player with the superior player.

In the control program described above, according to an exemplary embodiment, the action for changing the parameter set for the superior player may be an action for instructing to associate the second point associated with a player subordinate to the superior player with the superior player within a predetermined range of values different for each subordination rank of the player.

In the control program described above, according to an exemplary embodiment, in a case where a player is subordinate to the second player, the setting function may be implemented to make the player subordinate to the second player to be subordinate to the first player by setting a subordination rank of the player subordinate to the second player to be lower than that of the second player.

In the control program described above, according to an exemplary embodiment, the game apparatus may implement a reward association function in which the superior player is stored in the memory unit by associating different rewards with the superior player and each player of each subordination rank.

In the control program described above, according to an exemplary embodiment, in a case where the subordination rank may be set, the setting function may be implemented to transmit, to each player, display data for displaying a screen for exchanging a message between the superior player and the player subordinate to the superior player.

According to another exemplary embodiment, there may be provided a control method of a game apparatus provided with a memory unit to provide a game for executing a match between players, the control method including: a memory step for storing a plurality of players in the memory unit; a match execution step for executing a match between a plurality of players; a setting step for setting a first player who wins as a superior player to which a second player who loses may be subordinate on the basis of a result of execution of the match and setting a subordination rank of the second player; and a control step for performing control such that at least a part of executable actions may be different depending on a setting of the setting step, wherein, in a case where a player is subordinate to the first player, the setting function may be implemented to set a subordination rank of the second player on the basis of the subordination rank of the player subordinate to the superior player.

According to another exemplary embodiment, there may be provided a game apparatus configured to provide a game for executing a match between players, including: a memory unit configured to store a plurality of players; a match execution unit configured to execute a match between a plurality of players; a setting unit configured to set a first player who wins as a superior player to which a second player who loses may be subordinate on the basis of a result of execution of the match and set a subordination rank of the second player; and a control unit configured to perform control such that at least a part of executable actions may be different depending on a setting of the setting unit, wherein, in a case where a player is subordinate to the first player, the setting unit may be configured to set a subordination rank of the second player on the basis of the subordination rank of the player subordinate to the superior player.

Using the control program, the control method, and the game apparatus according to the invention, it may be possible to allow a player not allowed to participate in a game or event to get involved in the game and improve an interest of the player in the game.

BRIEF DESCRIPTION OF THE DRAWINGS

FIG. 12A is a diagram illustrating exemplary data structures of an exemplary table;

FIG. 12B is a diagram illustrating exemplary data structures of an exemplary table;

FIG. 13A is a diagram illustrating exemplary data structures of an exemplary table;

FIG. 13B is a diagram illustrating exemplary data structures of an exemplary table;

DETAILED DESCRIPTION

Various exemplary embodiments may now be described with reference to the accompanying drawings. Note that the technical scope of the invention may not be limited by such embodiments, and may further encompass, for example, the inventions described in the claims and their equivalents.

<Overview of Game>

Figure 1:
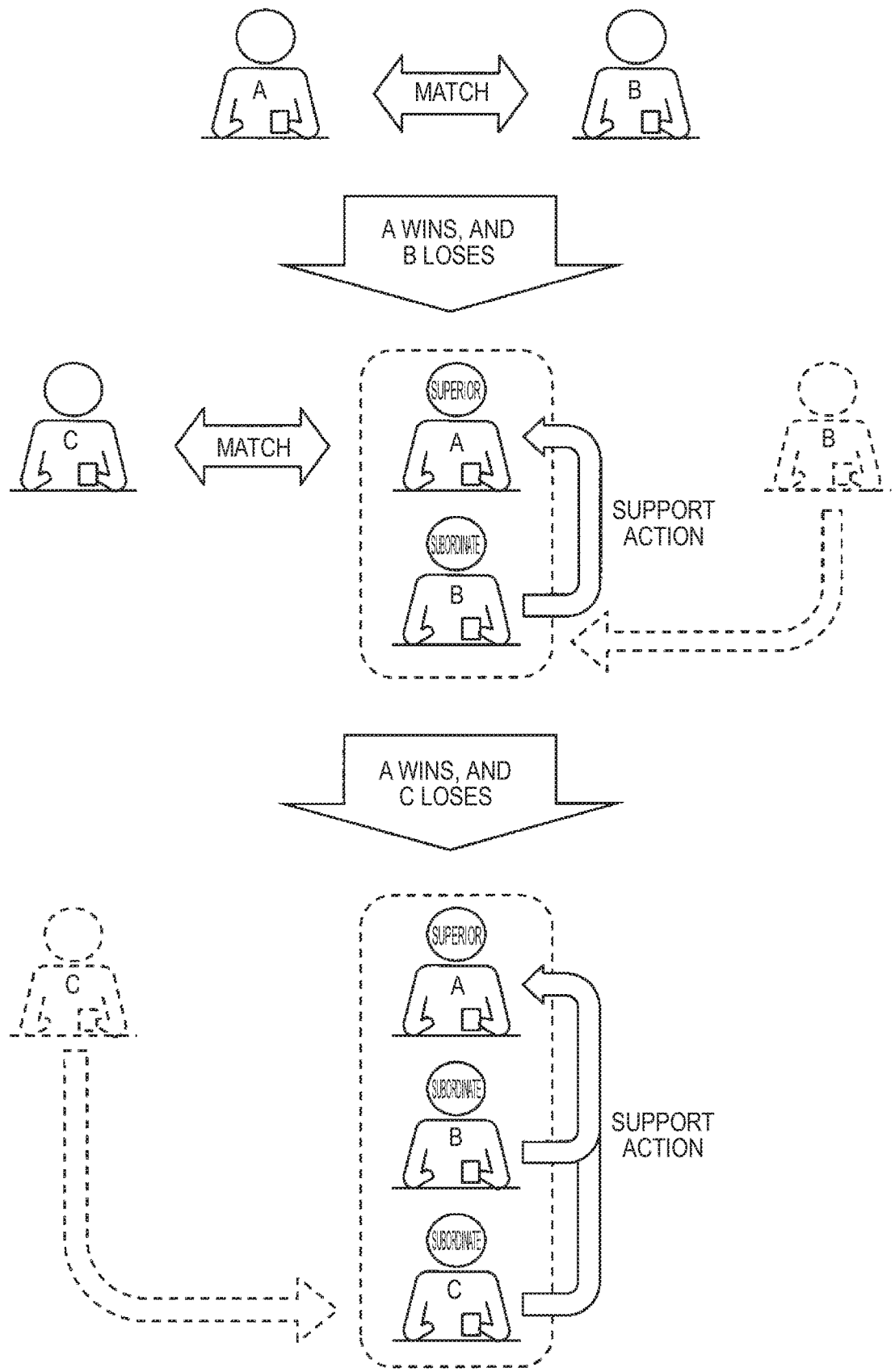
FIG. 1 is a diagram for describing an exemplary game provided by a game apparatus.
Figure 2:
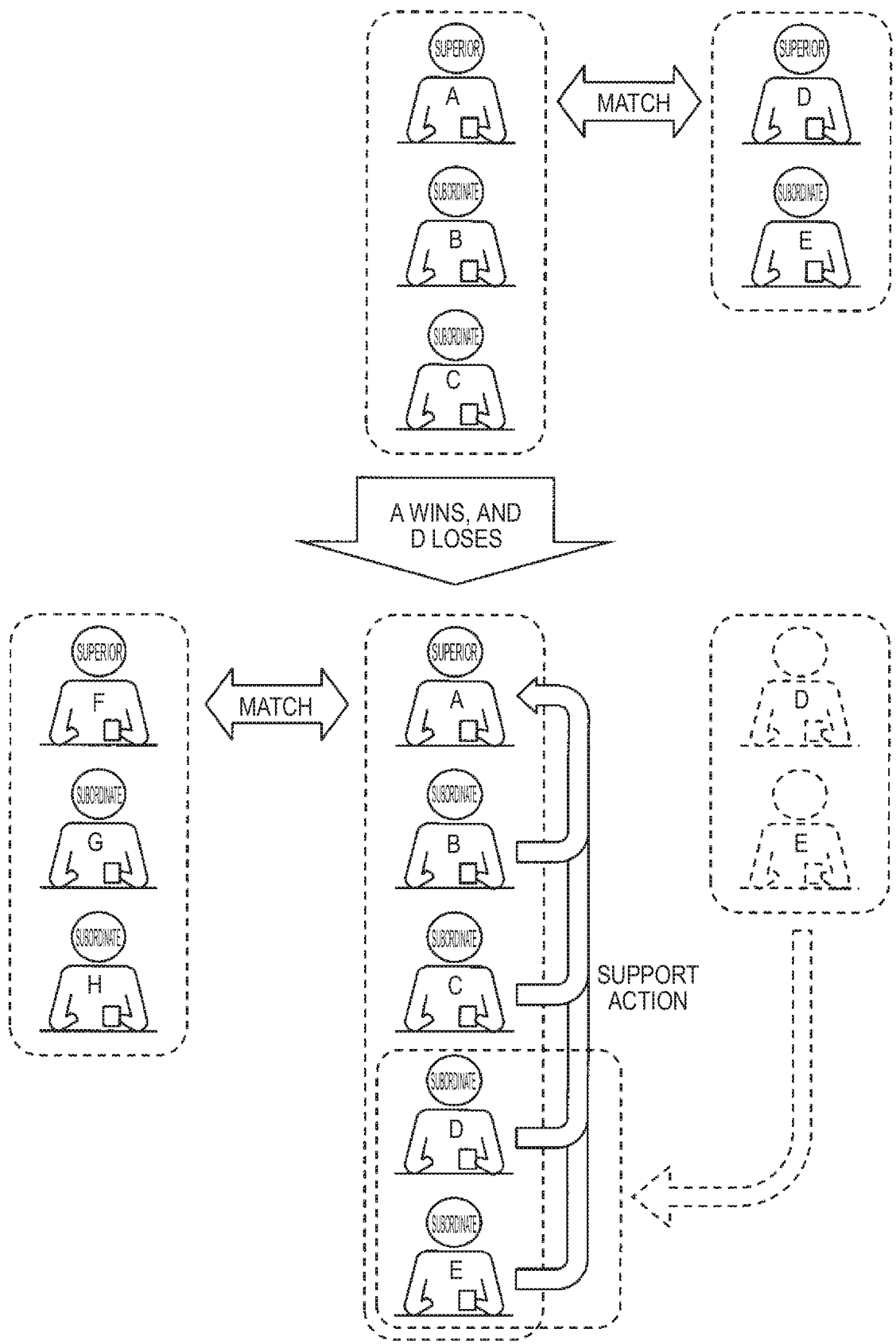
FIG. 2 is a diagram for describing an exemplary game provided by the game apparatus.
Figure 3:
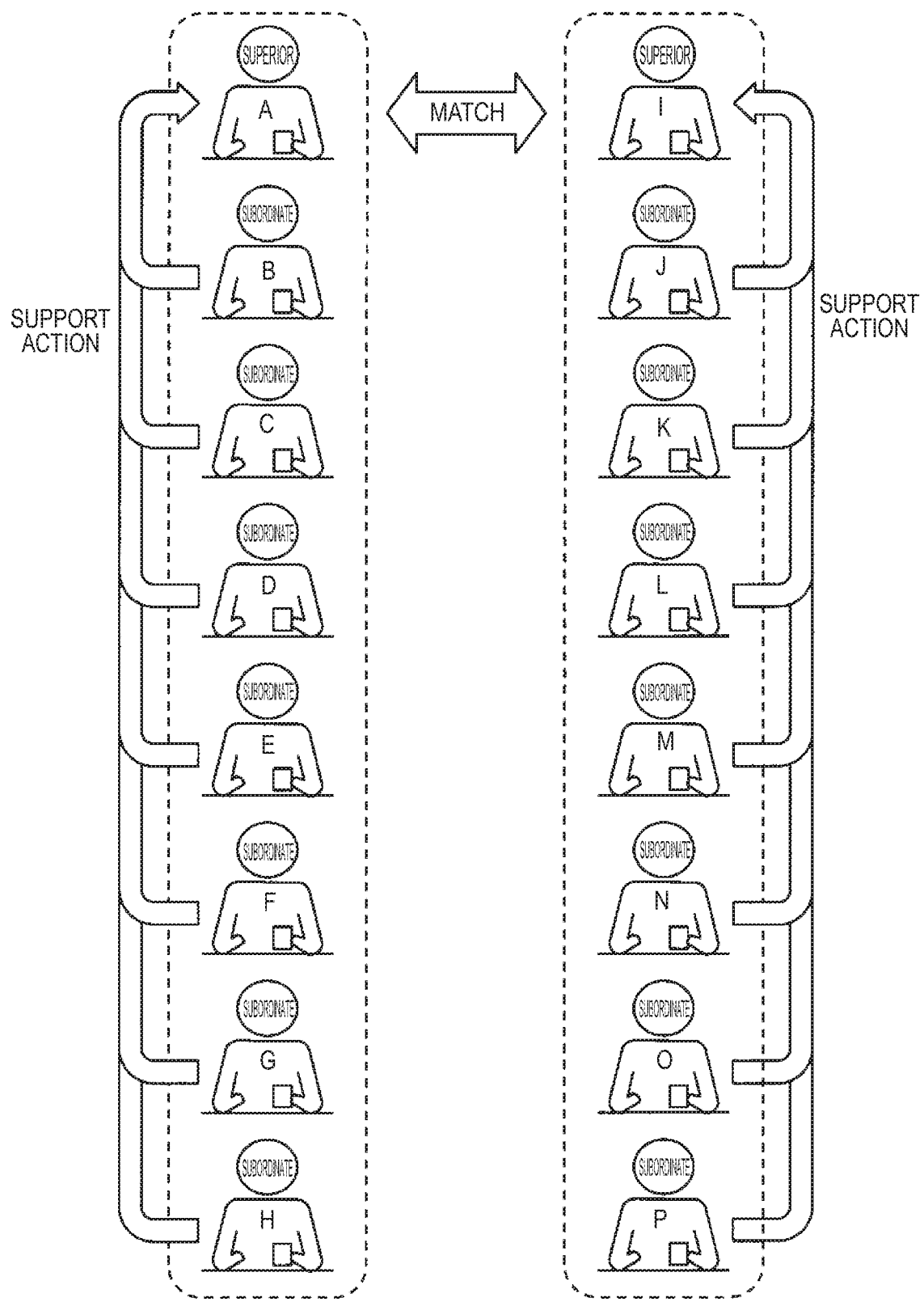
FIG. 3 is a diagram for describing an exemplary game provided by the game apparatus.

FIGS. 1 to 3 may be diagrams for describing an exemplary game provided by the game apparatus. An exemplary game provided by the game apparatus according to this embodiment may now be described with reference FIGS. 1 to 3.

In this embodiment, the game apparatus may have a match execution function for executing a match between players or groups to which a plurality of players belong. The game for a match between players may be a so-called player versus player (PvP) game in which a match may be executed between a game content manipulated by one of the players and a game content manipulated by the other player. Note that the game content may refer to electronic data used in the game, such as a card, item, character, and avatar. In addition, the game content may include electronic data that can be obtained, retained, used, managed, exchanged, synthesized, reinforced, sold, discarded, and/or donated by players during the game depending on a progress of the game. However, an aspect of the game content may not be limited to those described in this specification. In the following description, the game content manipulated by a player may be referred to as a use game content of a player.

A game in which a match between groups to which a plurality of players belong may be executed may be a so-called guild versus guild (GvG) game in which a match may be executed by a use game content of each player belonging to one of the groups and a use game content of each player belonging to the other group.

The group may be a player group consisting of a plurality of players who participate in the entire game or a part of the game provided by the game apparatus and may also be called a guild, clan, or party.

A setting function of the game apparatus may now be described by exemplifying a PvP game provided by the game apparatus that stores a plurality of players.

As illustrated in FIG. 1, in the PvP game provided by the game apparatus, a match may be executed by the game apparatus between players A and B selected from a plurality of players. As a result of executing the match between the players A and B, in a case where the player A wins, and the player B loses, the player A may be set as a superior player, and the player B may be set as a subordinate player. Note that the player A who wins in the match may be an example of the first player, and the player B who loses in the match may be an example of the second player.

The superior player may be a player controlled to execute a match with other players in the PvP game. The subordinate player may be a player whose behavior may be limited, compared to the superior player. For example, the subordinate player may be limited in what behavior they can perform in the match, may be limited from executing a match with other players in the PvP game, or the like.

The subordinate player may be subordinate to the superior player who was an opponent of the match winning against the subordinate player in the PvP game. Note that "the subordinate player may be subordinate to the superior player" means that the subordinate player may be stored by the game apparatus in association with the superior player. In addition, a subordination rank of the superior player may be set for each subordinate player subordinate to the superior player. The subordination rank may be a rank set depending on a timing at which the subordinate player becomes subordinate to the superior player. For example, after a match between players A and B is executed as illustrated in FIG. 1, only the player B may be set as the subordinate player subordinate to the player A, who may be set as the superior player. Therefore, the subordination rank of the player B for the superior player may be a first rank.

The subordinate player may be restricted from executing a match action used in the match in the PvP game, and instead may be able to execute a support action for supporting the superior player to which the subordinate player may be subordinate. The match action may be an action executable in the match such as attack, or hit point (HP) recovery in the battle game. The support action may be an action for supporting the superior player to which the subordinate player may be subordinate, such as an action for increasing a predetermined parameter of the superior player, the number of items, or the like.

The superior player may be permitted to execute a match with other players in the PvP game. That is, the superior player may be permitted to execute a match action used in the match in the PvP game. Meanwhile, the superior player may be restricted from executing the support action.

In this manner, the game apparatus may have a control function in which executable actions may be different between the superior player and the subordinate player. Hereinafter, the player A, the player B, and the player C, and . . . as superior players may be referred to as a representative player A, a representative player B, a representative player C, and . . . in some cases. Similarly, the player A, the player B, and the player C, and . . . as subordinate players may be referred to as a subordinate player A, a subordinate player B, a subordinate player C, and . . . in some cases.

Then, as illustrated in FIG. 1, after the match between players A and B is executed, a match may be executed between the superior player A and the player C selected by the game apparatus from a plurality of players. In a case where the superior player A wins, and the player C loses as a result of executing the match between the superior player A and the player C, the superior player A may be continuously set as the superior player, and the player C may be set as a subordinate player subordinate to the superior player A.

After executing the match between the superior player A and the player C, the subordinate players B and C may be set to be subordinate to the superior player A, and the subordinate players B and C may be controlled to execute the support action for supporting the superior player A.

The subordinate player B subordinate to the superior player A may be set to have a first subordination rank for the superior player A before executing the match between the superior player A and the player C. In addition, after executing the match between the superior player A and the player C, a subordination rank lower than that of the subordinate player B already subordinate to the superior player A, that is, the second subordination rank may be set to the subordinate player C as a subordination rank for the superior player A.

Then, as illustrated in FIG. 2, after executing the match between the superior player A and the player C, a match may be executed between the superior player A and a player D selected by the game apparatus from a plurality of players. The player D may be a superior player to which the subordinate player E may be subordinate. Hereinafter, the player D may be referred to as a superior player D in some cases.

In a case where the superior player A wins, and the superior player D loses as a result of executing a match between the superior player A and the superior player D, the superior player A may be continuously set as a superior player. In addition, the superior player D may be set as a subordinate player subordinate to the superior player A. In addition, a subordinate player E that has been subordinate to the superior player D until executing the match between the superior players A and D may be set as a subordinate player of the superior player A who wins against the superior player D. Furthermore, the subordinate players B, C, D, and E may be controlled to execute the support action for supporting the superior player A.

The first and second subordination ranks for the superior player A may be set to the subordinate players B and C, respectively, subordinate to the superior player A before executing the match between the superior players A and D. In addition, after executing the match between the superior players A and D, a subordination rank lower than those of the subordinate players B and C that have been already subordinate to the superior player A, that is, a third subordination rank may be set to the subordinate player D as a subordination rank for the superior player A. Furthermore, a subordination rank lower than that of the subordinate player D, that is, a fourth subordination rank may be set to a subordinate player E that may have been subordinate to the superior player D until executing the match between the superior players A and D as a subordination rank for the superior player A.

Then, as illustrated in FIG. 2, after the match between the superior players A and D may be executed, a match may be executed between the superior player A and a player F selected by the game apparatus from a plurality of players. The player F may be a superior player to which subordinate players G and H may be subordinate. Hereinafter, the player F may be referred to as a superior player F in some cases.

FIG. 3 may be a diagram illustrating a result of a match that may be executed between the superior players A and F, which may be a case where the superior player A wins, and the superior player F loses as a result of executing the match between the superior players.

Since, as a result of executing the match between the superior players A and F, the superior player A has won, the superior player A may be continuously set as a superior player. Since the superior player F has lost against the superior player A, the subordinate player F may be set as a subordinate player subordinate to the superior player A. In addition, the subordinate players G and H that have been subordinate to the superior player F until the match between the superior players A and F may be set as a subordinate player of the superior player A who wins against the superior player F. Furthermore, the subordinate players B, C, D, E, F, G, and H may be controlled to execute the support action for supporting the superior player A.

The first, second, third, and fourth subordination ranks for the superior player A may be set to the subordinate players B, C, D, and E, respectively, subordinate to the superior player A before the match between the superior players A and F is executed. After the match between the superior players A and F is executed, a subordination rank lower than those of the subordinate players B, C, D, and E that have been already subordinate to the superior player A, that is, a fifth subordination rank may be set to the subordinate player F as a subordination rank for the superior player A. In addition, subordination ranks lower than that of the subordinate player F, that is, sixth and seventh subordination ranks may be set to the subordinate players G and H that have been subordinate to the superior player F until the match between the superior players A and F may be executed, as subordination ranks for the superior player A.

As illustrated in FIG. 3, the subordinate players J, K, L, M, N, O, and P may be subordinate to the superior player I who makes a match with the superior player A. Therefore, in a case where the superior player A wins as a result of executing the match between the superior players A and I, the superior player I may be set as a subordinate player subordinate to the superior player A. In addition, a subordination rank lower than that of the subordinate player H that may have been already subordinate to the superior player A, that is, the eighth subordination rank may be set to the subordinate player I as a subordination rank for the superior player A.

The subordinate players J, K, L, M, N, O, and P that have been subordinate to the superior player I until the match between the superior players A and I may be executed may be set as subordinate players of the superior player A who wins against the superior player I. In addition, subordination ranks lower than that of the subordinate player I, that is, ninth, tenth, eleventh, twelfth, thirteenth, fourteenth, and fifteenth subordination ranks may be set to the subordinate players J, K, L, M, N, O, and P, respectively, as subordination ranks for the superior player A.

As described above with reference to FIGS. 1 to 3, the match execution function, the setting function, and the control function may be implemented in the PvP game using the game apparatus and the control method of the game apparatus described above. Therefore, even a subordinate player not allowed to participate in the match in the PvP game can get involved in the PvP game via the superior player who may be allowed to participate in the match in the PvP game. In this manner, using the game apparatus that implements the match execution function, the setting function, and the control function and the control method of the game apparatus, it may be possible to allow a player not allowed to participate in the match to get involved and improve a player's interest in the game.

Note that FIGS. 1 to 3 have been described above merely for deepening the understanding of the invention. The invention may be specifically embodied in each of the following embodiments and also may be embodied in various modifications without substantially exceeding the principle of the invention. All of such modifications encompass a disclosure range of this invention and this specification. For example, in a case where the game apparatus provides a GvG game, the players may be substituted with groups in the description of FIGS. 1 to 3.

<Configuration of Game System 1>

Figure 4:
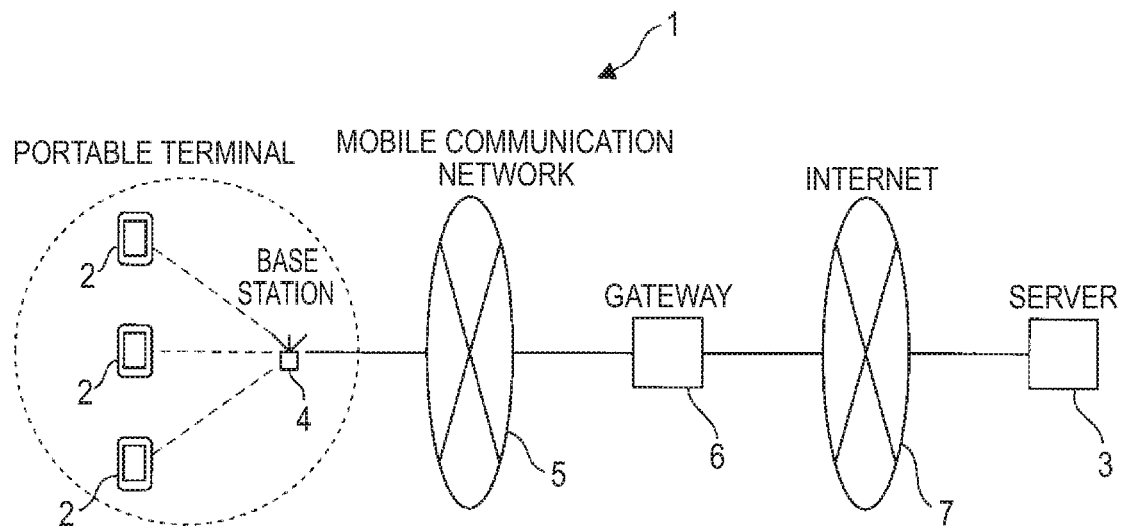
FIG. 4 is a diagram illustrating an exemplary schematic configuration of a game system 1.

FIG. 4 may be a diagram illustrating an exemplary schematic configuration of the game system 1.

The game system 1 may have a plurality of portable terminals 2 manipulated by each of a plurality of players and a server 3. The portable terminals 2 and the server 3 may be connected to each other via a communication network such as a base station 4, a mobile communication network 5, a gateway 6, and the Internet 7. A program executed by the portable terminal 2 (for example, a display processing program) and a program executed by the server 3 (for example, a match execution program) may communicate with each other using a communication protocol such as a hypertext transfer protocol (HTTP). Note that the server 3 may be an example of the game apparatus, but the game apparatus may not be limited to the server 3. A portable terminal 2 having all of or a part of the functions of the server 3 described below may also be used as the game apparatus. Furthermore, a game system 1 provided with the portable terminal 2 and the server 3 may also be used as the game apparatus.

Note that, although it may be assumed that a multi-function mobile phone (so-called smart phone) may be employed as the portable terminal 2, the invention may not be limited thereto. The portable terminal 2 may include, for example, a mobile phone (so-called feature phone), a portable information terminal (such as a personal digital assistant (PDA)), or an information processing apparatus such as a portable game machine, a portable music player, a tablet terminal, a tablet PC, and a notebook PC as long as the invention can be applied thereto.

<Configuration of Portable Terminal 2>

Figure 5:
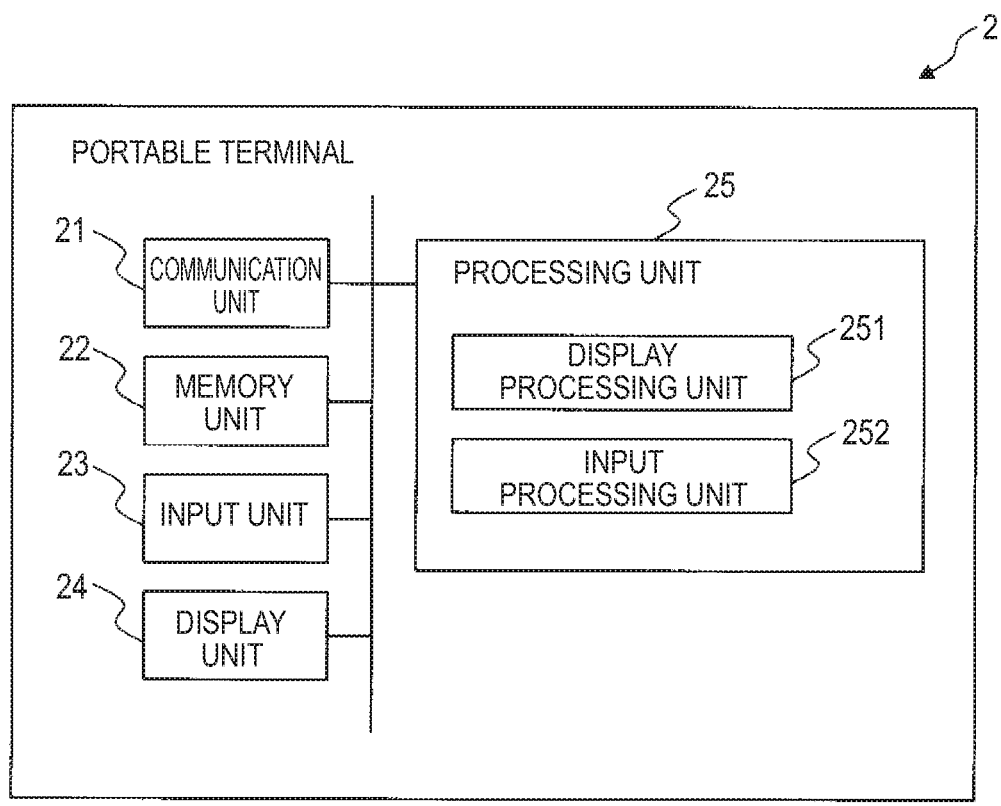
FIG. 5 is a diagram illustrating an exemplary schematic configuration of a portable terminal 2.

FIG. 5 may be a diagram illustrating an exemplary schematic configuration of the portable terminal 2.

The portable terminal 2 may execute a game that makes a match between players or between groups to which a plurality of players belong and may be connected to the server 3 via the base station 4, the mobile communication network 5, the gateway 6, and the Internet 7 to communicate with the server 3. The portable terminal 2 may control a progress of the game in response to a manipulation of a player on the input unit 23 (such as a touch panel). In addition, the portable terminal 2 may receive various data from the server 3 and may control the progress of the game. For this purpose, the portable terminal 2 may include a communication unit 21, a memory unit 22, an input unit 23, a display unit 24, and a processing unit 25.

The communication unit 21 may include a communication interface circuit including an antenna having a predetermined frequency band as a sensible band, and may connect the portable terminal 2 to the wireless communication network. The communication unit 21 may establish a wireless signal line based on a code division multiple access (CDMA) method or the like with the base station 4 via a channel that can be allocated by the base station 4 and communicates with the base station 4. In addition, the communication unit 21 may transmit data supplied from the processing unit 25 to the server 3 or the like. Furthermore, the communication unit 21 may supply the data received from the server 3 or the like to the processing unit 25.

The memory unit 22 may have, for example, a semiconductor memory device. The memory unit 22 may store an operating system program, driver programs, application programs such as a game control program, and data used in the processing of the processing unit 25. For example, the memory unit 22 may store driver programs such as an input device driver program for controlling the input unit 23 and an output device driver program for controlling the display unit 24. In addition, the memory unit 22 may store application programs such as a display processing program to display the display data relating to a progress of the game by causing the game to proceed on the basis of instruction data input in response to a manipulation of a player on the input unit 23, data obtained from the server 3, and the like. The memory unit 22 may store data such as data obtained from the server 3, cause data relating to a progress of the game to be displayed, video data, and image data. In addition, the memory unit 22 may temporarily store temporary data relating to a predetermined process.

The input unit 23 may include any device as long as the portable terminal 2 can be manipulated. For example, the input unit 23 may include a pointing device such as a touch panel. A player may enter letters, numerals, symbols, and the like using the input unit 23. As the input unit 23 may be manipulated by a player, it generates a signal corresponding to the manipulation. In addition, the generated signal may be supplied to the processing unit 25 as an instruction from the player.

The display unit 24 may be any device as long as it can display a video, an image, and the like. For example, the display unit 24 may include a liquid crystal display, an organic electroluminescence (EL) display, and the like. The display unit 24 may display a video corresponding to the video data, an image corresponding to the image data, and the like supplied from the processing unit 25.

The processing unit 25 may include a single or a plurality of processors and its peripheral circuits. The processing unit 25 may comprehensively control the entire operation of the portable terminal 2 and may include, for example, a central processing unit (CPU). The processing unit 25 may control the operation of the communication unit 21, the display unit 24, or the like such that various processes of the portable terminal 2 may be executed in an appropriate sequence on the basis of a program stored in the memory unit 22, a manipulation on the input unit 23, and the like. The processing unit 25 may execute the processes on the basis of the program stored in the memory unit 22 (such as an operating system program, a driver program, and an application program). Furthermore, the processing unit 25 may execute a plurality of programs (such as application programs) in parallel.

The processing unit 25 may include at least a display processing unit 251 and an input processing unit 252. Each of the units may be a functional module implemented by a program executed by the processor of the processing unit 25. Alternatively, each of the units may be embedded in the portable terminal 2 as firmware.

Various exemplary screens displayed on the display unit 24 of the portable terminal 2 owned by a player who participates in a match may now be described with reference to FIGS. 6A to 10B. FIGS. 6A to 10B illustrate a game provided by the game system 1 in which a match between a group A to which a plurality of players belong and a group B to which a plurality of players different from the plurality of players belonging to the group A may be executed. Note that each of the plurality of players belonging to the group A may be referred to as a player A, and each of the plurality of players belonging to the group B may be referred to as a player B in some cases.

The game provided by the game system 1 may be a game for a match between a group A and a group B selected by the game system 1 from a plurality of groups during a game execution period from a start date/time to an end date/time determined in advance. In addition, the game system 1 may execute the game a predetermined number of times in a match event during an event execution period set in advance. Note that, since a group losing in the match between the groups may be set as a subordinate group, a player belonging to this group may be controlled not to participate in the match during the event execution period of the match event thereafter.

The players A and B have respective parameters. The parameter may include, for example, an attack capability, a defense capability, a hit point (HP), an attack point (AP), and the like of the player. The attack capability may be a numerical value contributing to a magnitude of the damage applied to the opponent player of the match when a player attacks the opponent player of the match between groups. The defense capability may be a numerical value for reducing a magnitude of the damage given when a player receives an attack from the opponent player of the match. The HP may be a value reduced depending on the damage determined on the basis of the attack capability of the opponent player of the match and the defense capability of the player when the player receives an attack from the opponent player of the match. When the HP of the player becomes zero, the player may not be allowed to continuously play the game. The AP may be a value consumed when the player executes the match action. When the AP necessary to execute the match action is higher than the AP of the player, the match action may not be executed. Note that the AP may be an example of the first point.

Figure 6A:
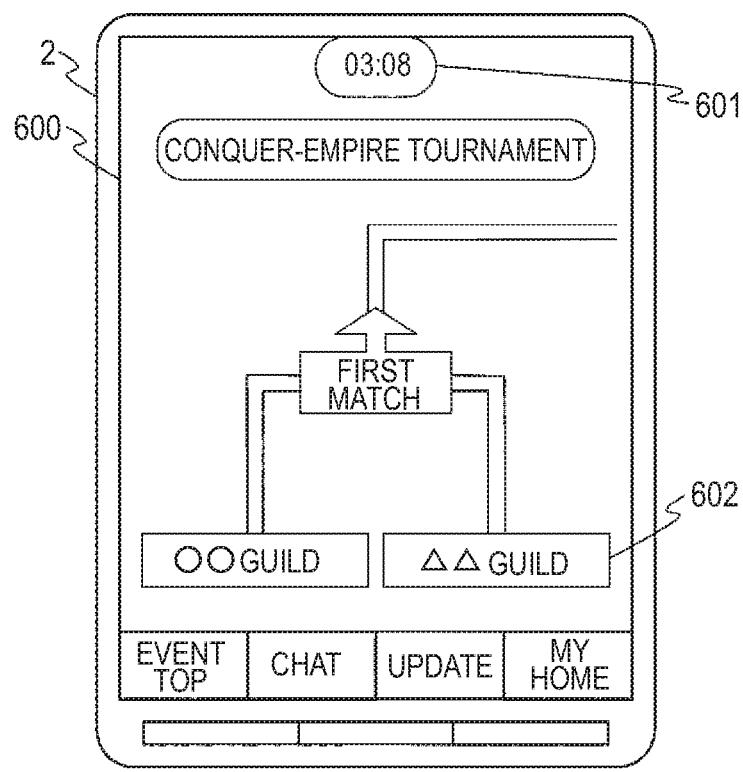
FIG. 6A is a diagram illustrating an exemplary screen displayed by the portable terminal 2.

FIG. 6A may be a diagram illustrating an exemplary game intro screen 600 displayed on the display screen of the portable terminal 2.

In a case where a game screen request may be issued to the server 3 in response to a manipulation of the player A on the input unit 23 before the game execution period, the portable terminal 2 may display the game intro screen 600 on the display unit 24 on the basis of the display data transmitted from the server 3. The game intro screen 600 may be displayed when the player A who owns the portable terminal 2 is not a subordinate player. On the game intro screen 600, a remaining time 601 until the start date/time of the game, a match opponent name 602, and the like may be displayed.

Figure 6B:
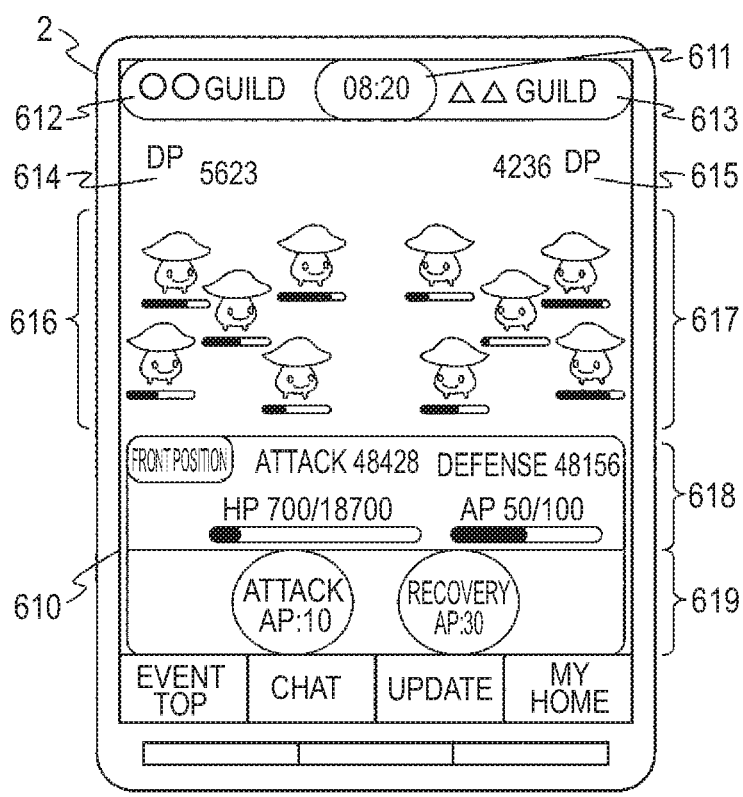
FIG. 6B is a diagram illustrating an exemplary screen displayed by the portable terminal 2.

FIG. 6B may be a diagram illustrating an exemplary game screen 610 displayed on the display screen of the portable terminal 2.

When a game screen request is issued to the server 3 in response to a manipulation of the player A on the input unit 23 during the game execution period, the display data transmitted from the server 3 cause the game screen 610 to be displayed on the display unit 24 of the portable terminal 2. The game screen 610 may be displayed when the player A who owns the portable terminal 2 is not a subordinate player.

On the game screen 610, a time 611 elapsing from the start date/time of the game, a name 612 of the group A, a name 613 of the group B, a damage point 614 of the group A, a damage point 615 of the group B, use game media 616 of each player A, use game media 617 of each player B, a parameter 618 of the player A who owns the portable terminal 2, a match action instruction button 619, and the like may be displayed.

The "damage points of a group" may refer to a value based on a total amount of the damage applied to a match opponent when a player belonging to a group attacks the match opponent player, and for example, a total reduction amount of the HP of the match opponent player. The used game media 616 of each player A may refer to the used game media of all the players A belonging to the group A or the used game media of a part of the players A. The used game media 616 of each player B may refer to the used game media of all the players B belonging to the group B or the used game media of a part of the players B. The parameter 618 may refer to parameters of the attack capability, the defense capability, the HP, the AP, and the like of the player A who owns the portable terminal 2. Note that the parameter may include an arrangement position of the use game content in the match between groups. The arrangement position may include, for example, a front position, a rear position, and the like. As the match action instruction button 619 may be pressed (selected) by the player, a match action corresponding to the match action instruction button 619 may be executed. For example, if a match action instruction button 619 for an attack is selected, an attack on a player randomly selected from the match opponent players may be executed. In addition, if a match action instruction button 619 for an HP recovery is selected, the HP recovery for increasing the HP of the player or the HP of other players belonging to the group of the player may be executed.

Figure 7A:
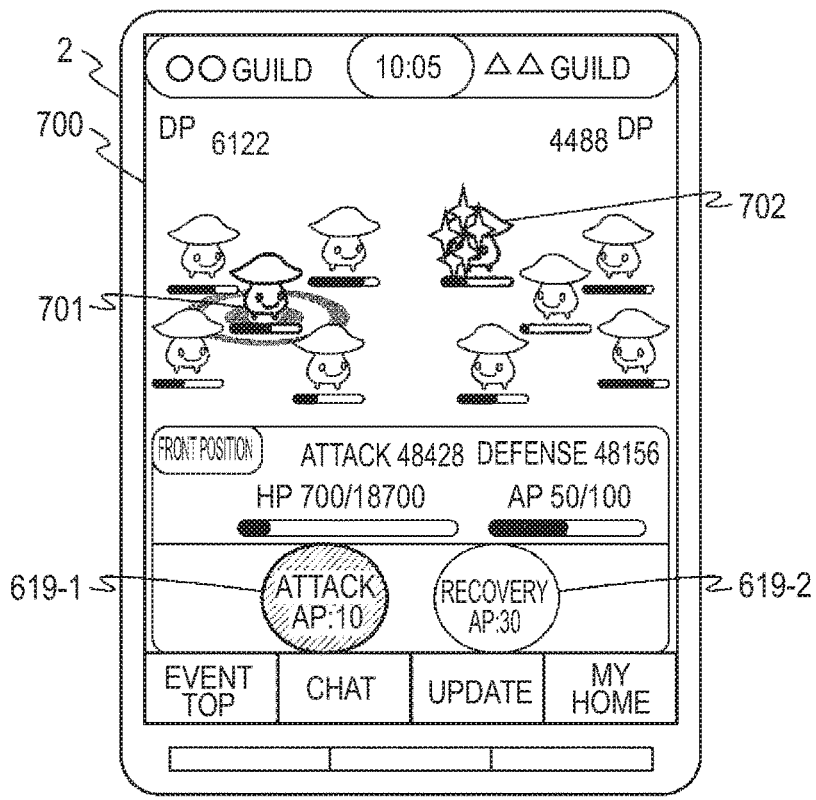
FIG. 7A is a diagram illustrating an exemplary screen displayed by the portable terminal 2.

FIG. 7A may be a diagram illustrating an exemplary game screen 700 displayed on the display screen of the portable terminal 2.

The portable terminal 2 may display the game screen 700 showing an attack on the match opponent player B on the display unit 24 when the match action instruction button 619-1 for an attack may be selected in response to a manipulation of the player A on the input unit 23. On the game screen 700, an image representing a scene in which a use game content 701 of the player who selects the match action instruction button 619-1 for an attack attacks a use game content 702 of the match opponent player, or the like may be displayed. Note that, if a match action instruction button 619-2 for HP recovery is selected in response to a manipulation of the player A on the input unit 23, a game screen (not illustrated) representing an action of the HP recovery may be displayed on the display unit 24.

Figure 7B:
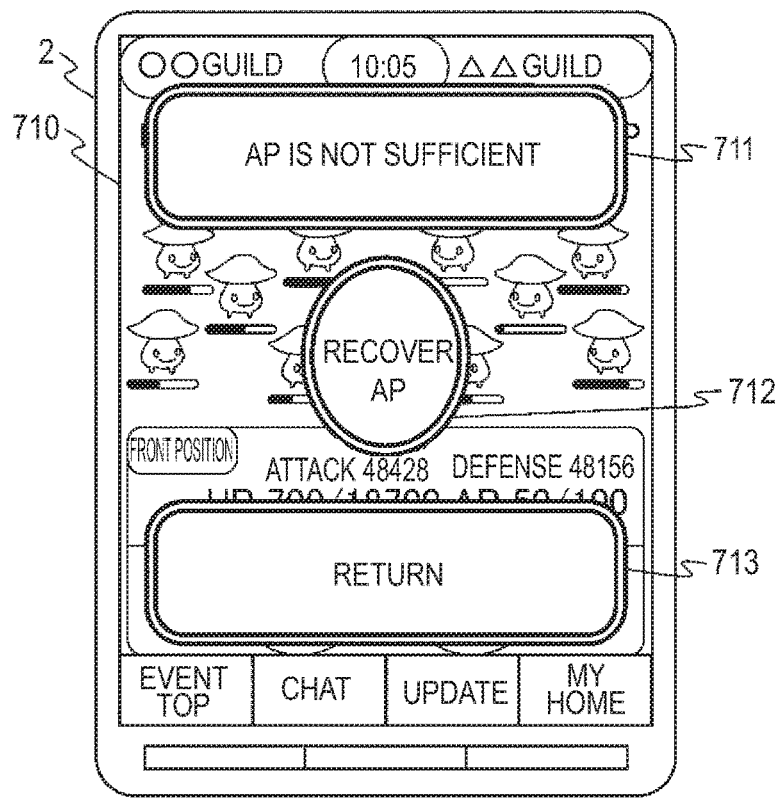
FIG. 7B is a diagram illustrating an exemplary screen displayed by the portable terminal 2.

FIG. 7B may be a diagram illustrating an exemplary game screen 710 displayed on the display screen of the portable terminal 2.

The portable terminal 2 may display the game screen 710 on the display unit 24 if the AP necessary to execute the match action corresponding to the match action instruction button 619 selected in response to a manipulation of the player A on the input unit 23 is higher than the AP of the player A. On the game screen 710, AP deficiency notification information 711, an AP recovery button 712, and a return button 713, the like may be displayed.

The AP deficiency notification information 711 may be character information, image information, and the like representing that it may not be permitted to execute the match action because the AP necessary to execute the match action corresponding to the selected match action instruction button 619 is higher than the AP of the player A.

As the AP recovery button 712 may be pressed (selected) by the player A, the AP recovery for increasing the AP of the player A may be executed. Note that each player A may execute the AP recovery by consuming the AP recovery item of the group A to which each player A belongs. The group A can obtain the AP recovery item as a reward corresponding to the execution result of a specific event executed by the player A. Note that the specific event may include a match even between the player A and a specific opponent game content, or the like. Note that the number of the AP recovery items may be an example of the second point.

Figure 8A:
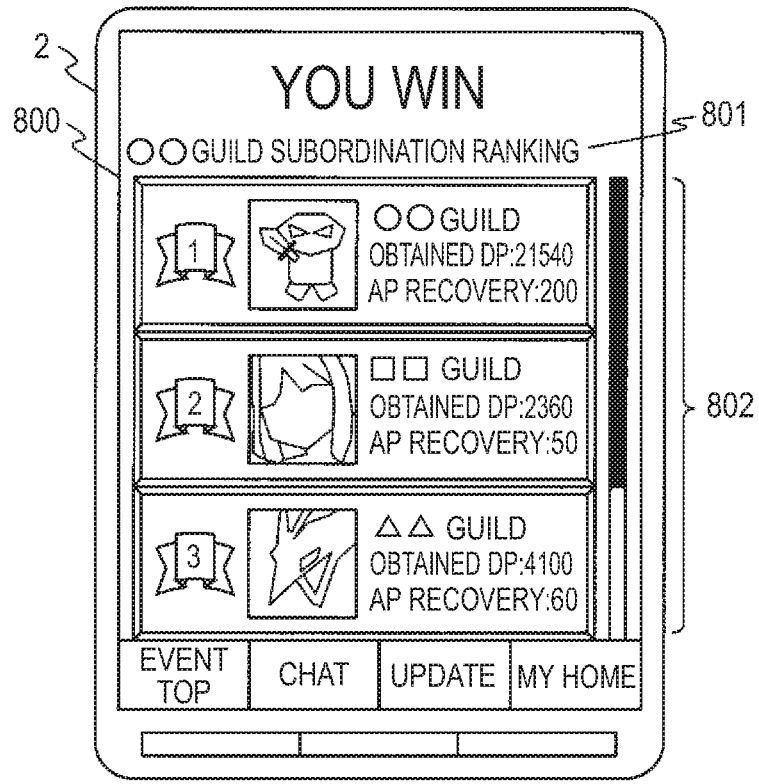
FIG. 8A is a diagram illustrating an exemplary screen displayed by the portable terminal 2.

FIG. 8A may be a diagram illustrating an exemplary subordination rank screen 800 displayed on the display screen of the portable terminal 2.

In a case where the group A wins as a result of executing the match between the groups A and B, the portable terminal 2 owned by the player A may display a subordination rank screen 800 on the display unit 24 on the basis of the display data transmitted from the server 3 after the end date/time of the game execution period.

A superior group name 801, a subordinate group list 802, and the like may be displayed on the subordination rank screen 800. The superior group name 801 may be a name of the superior group winning in the match. As illustrated in FIG. 8A, the name "○○ GUILD" of the group A winning in the match against the group B may be displayed as a name of the superior group. Superior group information regarding the subordinate group subordinate to the superior group winning in the match may be displayed in the subordinate group list 802 in a list format in the order of the subordination rank. For example, as illustrated in FIG. 8A, the subordinate group list 802 may contain a subordination rank "3," a name "ΔΔ GUILD," an obtained damage point "4100," the number of owned AP recovery items "60," and the like as subordinate group information of the group B losing in the match.

Figure 8B:
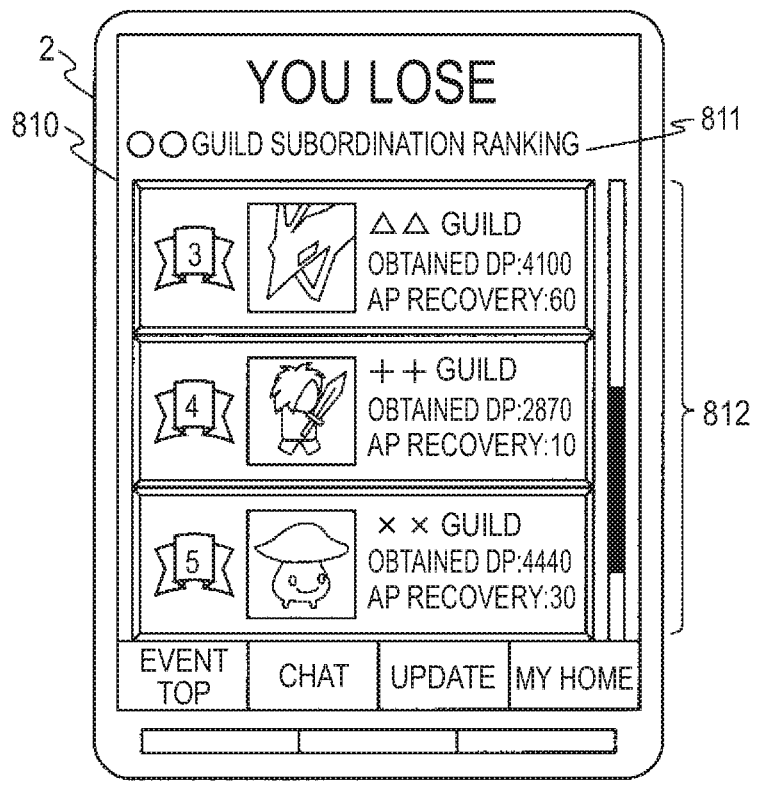
FIG. 8B is a diagram illustrating an exemplary screen displayed by the portable terminal 2.

FIG. 8B may be a diagram illustrating an exemplary subordination rank screen 810 displayed on the display screen of the portable terminal 2.

In a case where the group B loses as a result of executing the match between the groups A and B, the portable terminal 2 owned by the player B may display a subordination rank screen 810 on the display unit 24 on the basis of the display data transmitted from the server 3 after the end date/time of the game execution period.

On the subordination rank screen 810, a superior group name 811, a subordinate group list 812, and the like may be displayed. The superior group name 811 may be a name of the superior group winning in the match. As illustrated in FIG. 8B, a name "○○ GUILD" of the group A winning in the match with the group B may be displayed as a name of the superior group. Subordinate group information regarding the subordinate group subordinate to the superior group winning in the match may be displayed in the subordinate group list 812 in a list format in the order of the subordination rank. Note that, as illustrated in FIG. 8B, the subordinate group list 812 may contain a subordination rank "3," a name "ΔΔ GUILD," an obtained damage point "4100," the number of owned AP recovery items "60," and the like as subordinate group information of the group B losing in the match.

Figure 9A:
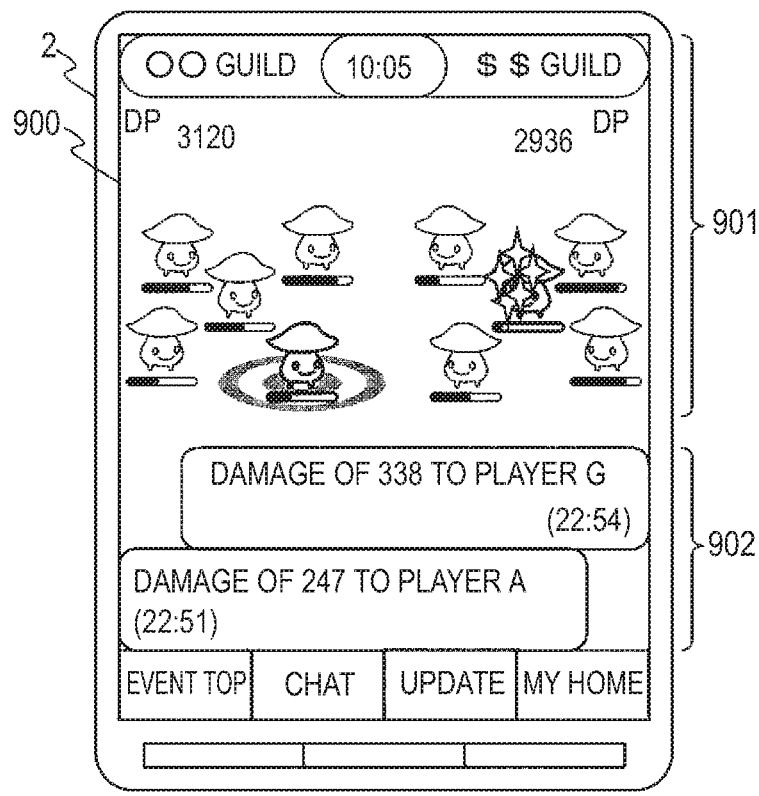
FIG. 9A is a diagram illustrating an exemplary screen displayed by the portable terminal 2.

FIG. 9A may be a diagram illustrating an exemplary watching screen 900 displayed on the display screen of the portable terminal 2.

If a game screen request is issued to the server 3 in response to a manipulation of the player B on the input unit 23 during the game execution period, the portable terminal 2 may display the watching screen 900 on the display unit 24 on the basis of the display data transmitted from the server 3. Note that the watching screen 900 may be displayed when the group B to which the player B owning the portable terminal 2 belongs is a subordinate group. In addition, the game execution period may be a game execution period of the game in which the superior group to which the group B of the player B owning the portable terminal 2 may be subordinate participates.

On the watching screen 900, a game broadcast image 901, game live information 902, and the like may be displayed. On the game broadcast image 901, time elapsing from the start date/time, names of each group participating in the match, damage points of each group participating in the match, use game media of each player A of each group participating in the match, and the like for a game being executed may be displayed. Note that the game being executed may be a game in which a superior group to which the group B of the player B owning the portable terminal 2 may be subordinate participates. On the game live information 902, a result of the game depending on a match action executed by each group during the match in the game being executed may be displayed in a time series manner.

Figure 9B:
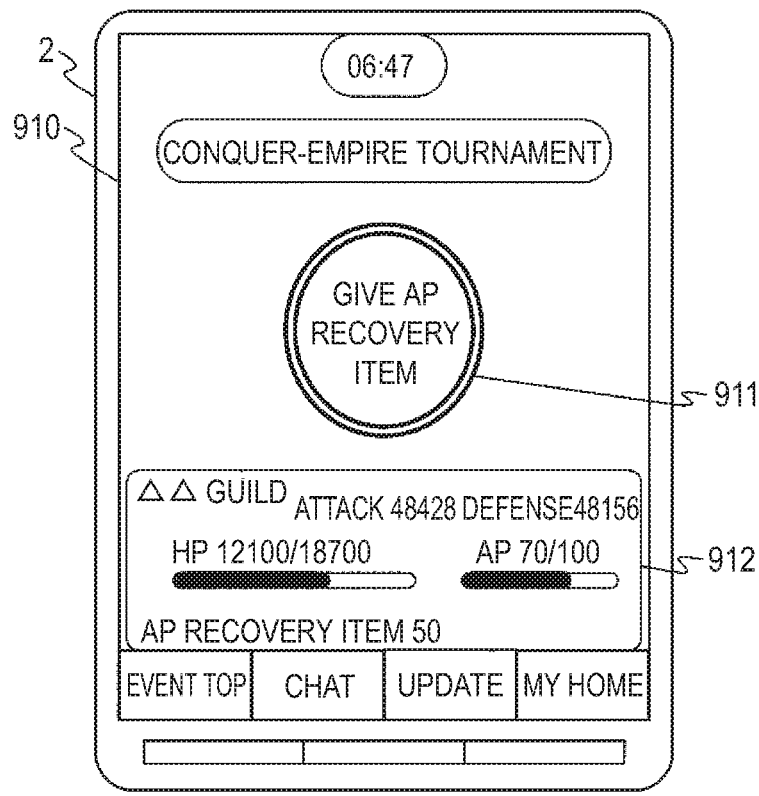
FIG. 9B is a diagram illustrating an exemplary screen displayed by the portable terminal 2.

FIG. 9B may be a diagram illustrating an exemplary support screen 910 displayed on the display screen of the portable terminal 2.

If a game screen request may be issued to the server 3 in response to a manipulation of the player B on the input unit 23 before the game execution period, the portable terminal 2 may display a support screen 910 on the display unit 24 on the basis of the display data transmitted from the server 3. Note that the support screen 910 may be displayed when the group B to which the player B owning the portable terminal 2 is subordinate is a subordinate group.

On the support screen 910, an AP recovery item applying button 911, a parameter 912 of the player B, and the like may be displayed. As the AP recovery item applying button 911 is pressed (selected) by the player B owning the portable terminal 2, item recovery (in which the number of the AP recovery items of the superior group to which the group B of the player B is subordinate may increase) may be executed. Note that item recovery may be an example of the support action. The number of AP recovery items of the superior group which may be provided by the item recovery may be configured to be equal to or smaller than the number of the AP recovery items of the group B to which the player B who presses the AP recovery item applying button 911 belongs. In this case, the number of the AP recovery items of the group B to which the player B who presses the AP recovery item applying button 911 belongs may be reduced as the number of the AP recovery items of the superior group is increased. Note that the number of the AP recovery items of the superior group which may be increased by the item recovery may be configured to be equal to or smaller than the number of the AP recovery items of the player B who presses the AP recovery item applying button 911. In this case, the number of the AP recovery items of the player B who presses the AP recovery item applying button 911 may be reduced as the number of the AP recovery items of the superior group is increased.

A parameter 912 of the player B may include parameters such as a name of the group B to which the player B owning the portable terminal 2 belongs, an attack capability, a defense capability, an HP, and an AP of the player B, and the like. Note that the parameter may include the number of AP recovery items of the group B or the player B.

Figure 10A:
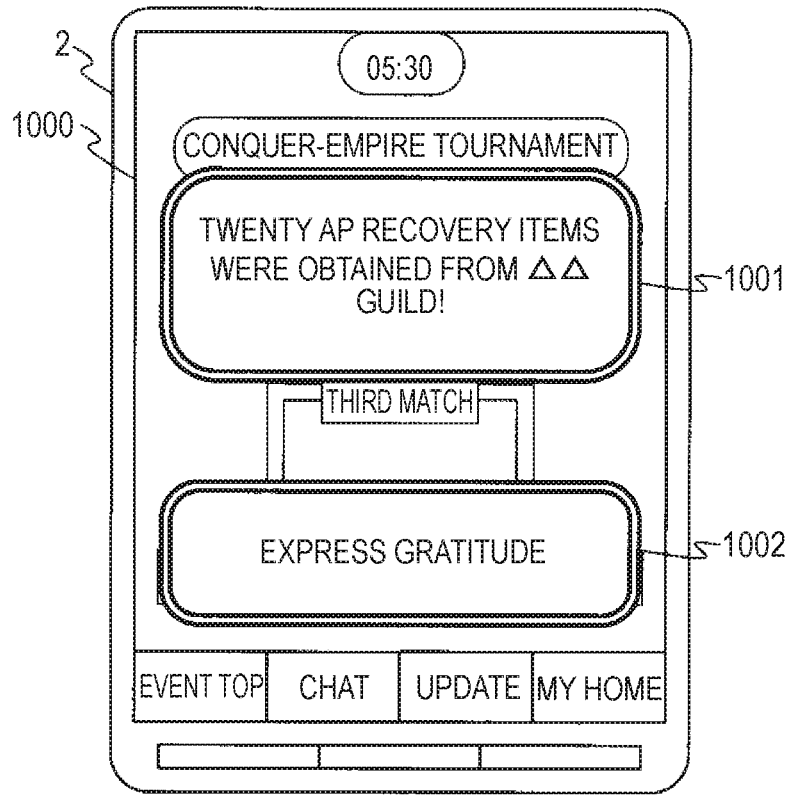
FIG. 10A is a diagram illustrating an exemplary screen displayed by the portable terminal 2.

FIG. 10A may be a diagram illustrating an exemplary support notification screen 1000 which may be displayed on the display screen of the portable terminal 2.

In a case where the group A to which the player A owning the portable terminal 2 belongs is a superior group, and the player B belonging to the subordinate group B (subordinate to the group A) executes the item recovery, the portable terminal 2 may display the support notification screen 1000 on the display unit 24 on the basis of the display data transmitted from the server 3.

On the support notification screen 1000, notification information 1001 representing that the subordinate group B has executed the item recovery, a notification instruction button 1002 for notifying predetermined message information such as gratitude to the subordinate group B, and the like may be displayed. As the notification instruction button 1002 is pressed (selected) by the player A, predetermined message information may be notified to the portable terminal 2 of the player B who may execute the item recovery. Note that, in a case where the notification instruction button 1002 is pressed (selected) by the player A, a screen for allowing the player A to enter a message may be displayed, so that the message entered by the player A may be provided to the portable terminal 2 of the player B as the predetermined message information. Note that a destination of the notification of the predetermined message information may include portable terminals 2 of all the players or a part of the players belonging to the group B of the player B who executed the item recovery.

Figure 10B:
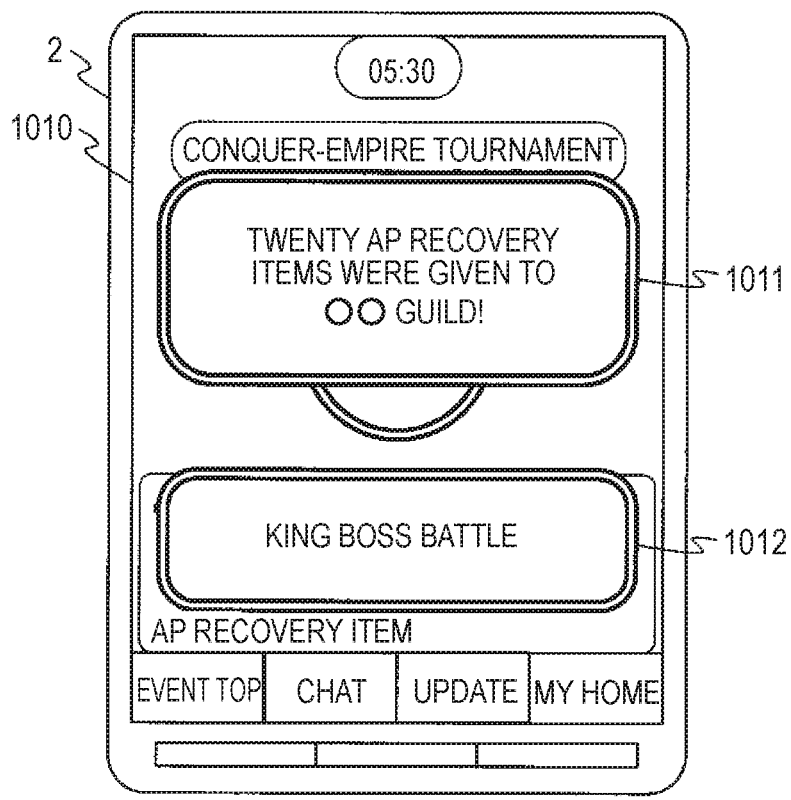
FIG. 10B is a diagram illustrating an exemplary screen displayed by the portable terminal 2.

FIG. 10B may be a diagram illustrating an example of a support result screen 1010 which may be displayed on the display screen of the portable terminal 2.

In a case where the group B to which the player B owning the portable terminal 2 belongs is a subordinate group, and the player B executes the item recovery, the portable terminal 2 may display the support result screen 1010 on the display unit 24 on the basis of the display data transmitted from the server 3.

On the support result screen 1010, notification information 1011 representing that item recovery has been executed for the superior group A to which the subordinate group B is subordinate, an event button 1012 for executing a specific event, and the like may be displayed. As the event button 1012 is pressed (selected) by the player B, an event screen (not shown) for executing a specific event may be displayed on the display unit 24 on the basis of the display data transmitted from the server 3. In addition, as a result of executing a specific event that may be executed as the player B manipulates the event screen, one or more AP recovery items may be provided as a reward to the player B or to the group B to which the player B belongs.

<Configuration of Server 3>

Figure 11:
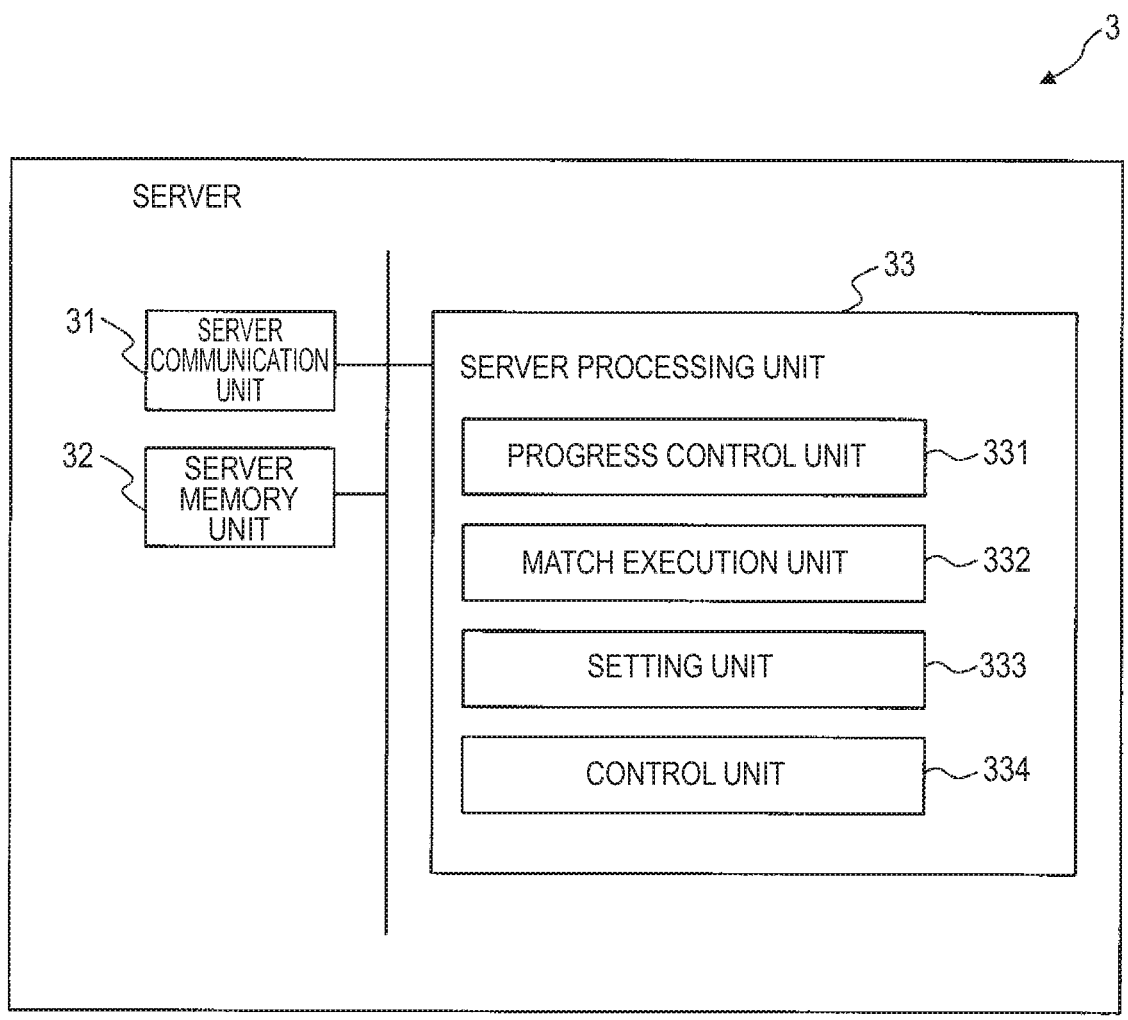
FIG. 11 is a diagram illustrating an exemplary schematic configuration of the server 3.

FIG. 11 may be a diagram illustrating an exemplary schematic configuration of the server 3. In addition, FIGS. 12A, 12B, 13A, and 13B may be diagrams illustrating exemplary data structures of various tables stored in the server memory unit 32.

The server 3 may include a server communication unit 31, a server memory unit 32, and a server processing unit 33. The server 3 may cause the game to proceed in response to a request from the portable terminal 2. In addition, the server 3 creates display data and the like relating to the progress of the game and may transmit them to the portable terminal 2.

The server communication unit 31 may have a communication interface circuit for connecting the server 3 to the Internet 7 to allow communication with the Internet 7. In addition, the server communication unit 31 may supply the data received from the portable terminal 2 or the like to the server processing unit 33. Furthermore, the server communication unit 31 may transmit the data supplied from the server processing unit 33 to the portable terminal 2 or the like.

The server memory unit 32 may include, for example, at least one of a magnetic tape apparatus, a magnetic disc apparatus, or an optical disc apparatus. The server memory unit 32 may store an operating system program, a driver program, an application program, data, and the like used in the processing of the server processing unit 33. For example, the server memory unit 32 may cause the game to proceed as an application program and may store a game program or the like that creates display data relating to a result thereof. A computer program may be installed in the memory unit 22 using a setup program or the like well known in the art from a computer-readable portable recording medium such as a CD-ROM or a DVD-ROM.

The server memory unit 32 may store, as the data, a player table of FIG. 12A and a group table of FIG. 12B. In addition, the server memory unit 32 may store a subordination table of FIG. 13A and a match table of FIG. 13B. Furthermore, the server memory unit 32 may store various image data or the like relating to a progress of the game. Moreover, the server memory unit 32 may temporarily store temporary data relating to a predetermined process. That is, the server memory unit 32 may have a volatile memory (such as a random access memory (RAM)) to store dynamic data that changes depending on a progress of the game.

FIG. 12A illustrates a player table for managing the players. The player table may store player identifications (IDs), names of players, attack capabilities, defense capabilities, HPs, and APs of each player in association with each other. The player ID may be an example of identification information for uniquely identifying each player.

The HP of the current date/time and a maximum HP may be stored in the HP column. The maximum HP may be a maximum value of the HP recovered by executing the HP recovery. The AP of the current date/time and the maximum AP may be stored in the AP column. The maximum AP may be a maximum value of the AP recovered by executing the AP recovery.

FIG. 12B illustrates the group table for managing the groups. The group table may store group IDs of the groups, group names, affiliated players, obtained DPs, and the number of owned AP recovery items for each group in association with each other. The group ID may be an example of identification information for uniquely identifying each group. The affiliated player column may store the player ID of each player belonging to the group.

FIG. 13A illustrates a subordination table for managing subordinate groups subordinate to the superior group. The subordination table may store group IDs of the groups, superior group IDs, ranks in subordinate group, and the like for each group in association with each other. Note that the groups of the group IDs having a common superior group ID may be subordinate groups, and the subordinate groups may be managed using the subordination table. The rank in the subordinate group may be a subordination rank of the group in the superior group to which the corresponding group belongs. Note that a table storing the group IDs of the subordinate groups subordinate to the corresponding superior group for each group ID of the superior group may be used as the subordination table. In this case, the group ID of the subordinate group may be stored for each group ID of the superior group depending on the subordination ranks.

FIG. 13B illustrates a match table for managing a game for each match during a match event. The match table may store a period ID of the corresponding period, a game execution period, match information, and the like for the game execution period of the game for the match in association with each other.

The period ID may be an example of identification information for uniquely identifying an execution period of each match. The game execution period column may store a start date/time and an end date/time of the corresponding execution period. The match information may contain a set of group IDs representing a combination of groups participating in the match executed during the corresponding game execution period. Note that, since the match information represents a combination of superior groups set on the basis of a result of the game of the previous game execution period, the combination of groups may be stored in the match information after the previous game execution period may be terminated, and a predetermined matching time elapses.

Returning to FIG. 11, the server processing unit 33 may include at least a progress control unit 331, a match execution unit 332, a setting unit 333, and a control unit 334. Each unit may be a functional module implemented by a program executed using a processor provided in the server processing unit 33. Alternatively, each unit may be embedded in the server 3 as firmware.

Exemplary functions of the display processing unit 251 and the input processing unit 252 provided in the processing unit 25 of the portable terminal 2, and the progress control unit 331, the match execution unit 332, the setting unit 333, and the control unit 334 provided in the server processing unit 33 of the server 3 may now be described.

<Functions of Display Processing Unit 251>

The display processing unit 251 of the portable terminal 2 may receive display data transmitted from the server 3 via the communication unit 21 and may display various screens on the display unit 24 on the basis of the received display data.

As the display processing unit 251 may be instructed to display the game screen 740 from the input processing unit 252, a game screen 710 having at least an AP recovery button 712 may be displayed on the display unit 24.

The display processing unit 251 may receive various data transmitted from the server 3 along with the display data via the communication unit 21 and may store various received data in the memory unit 22.

<Functions of Input Processing Unit 252>

The input processing unit 252 of the portable terminal 2 may transmit a game screen request for requesting a game screen relating to a game provided by the server 3 to the server 3 via the communication unit 21 in response to a manipulation of the player on the input unit 23. Note that the game screen request may include a player ID of the player who transmits a game participation request.

The input processing unit 252 may determine whether or not the match action instruction button 619 displayed on the game screen 610 may be selected on a predetermined time interval basis. In a case where the match action instruction button 619 displayed on the game screen 610 is selected, the input processing unit 252 may determine whether the match action corresponding to the selected match action instruction button 619 may be an attack match action or a HP recovery match action.

The input processing unit 252 may determine whether or not the AP necessary to execute the determined match action is higher than the AP of the player. If it is determined that the AP necessary to execute the determined match action is equal to or lower than the AP of the player, the input processing unit 252 may create a match action execution request including a command representing the determined match action. If it is determined that the AP necessary to execute the determined match action is higher than the AP of the player, the input processing unit 252 may instruct the display processing unit 251 to display the game screen 710.

The input processing unit 252 may determine whether or not the AP recovery button 712 displayed on the game screen 710 is selected. Then, the input processing unit 252 may execute the AP recovery if it is determined that the AP recovery button 712 is selected. Note that, if the AP recovery is executed, the input processing unit 252 may reduce the number of the owned AP recovery items of the group to which the player belongs, stored in the memory unit 22 by a predetermined number. Note that the predetermined number may be set to "1," or it may be determined depending on a recovery amount of the AP.

Note that, if the AP recovery is executed, the input processing unit 252 may insert the reduced number of the owned AP recovery items into the match action execution request.

The input processing unit 252 may determine whether or not the AP recovery item applying button 911 displayed on the support screen 910 is selected. If it is determined that the AP recovery item applying button 911 is selected, the input processing unit 252 may create a support action execution request. The support action execution request may contain a player ID of the subordinate player who presses the AP recovery item applying button 911. Note that the support action execution request may be a request for increasing the number of the owned AP recovery items of the superior group to which the subordinate group of the subordinate player who presses the AP recovery item applying button 911 belongs by a predetermined number.

The input processing unit 252 may transmit the match action execution request created in the match input process and the support action execution request created in the support input process to the server 3 via the communication unit 21.

<Functions of Progress Control Unit 331>

If the progress control unit 331 of the server 3 receives the game screen request transmitted from the portable terminal 2 via the server communication unit 31, the progress control unit 331 may transmit the player ID included in the game screen request and a receipt date/time at which the game participation request was received to the control unit 334 and may instruct the control unit 334 to execute a player control process.

If the progress control unit 331 is instructed from the control unit 334 to create display data for displaying the game intro screen 600, the progress control unit 331 may create the display data for displaying the game intro screen 600 on the basis of various data stored in the match table.

If the progress control unit 331 is instructed from the control unit 334 to create display data for displaying the game screen 610, the progress control unit 331 may create the display data for displaying the game screen 610 on the basis of various data stored in the match table, the player table, and the group table.

If the progress control unit 331 is instructed from the control unit 334 to create display data for displaying the support screen 910, the progress control unit 331 may create the display data for displaying the support screen 910 on the basis of various data stored in the player table and the group table.

If the progress control unit 331 is instructed from the control unit 334 to create display data for displaying the watching screen 900, the progress control unit 331 may specify a group ID of the superior group associated with the specified subordinate group and may create the display data for displaying the watching screen 900 on the basis of various data stored in the match table, the player table, and the group table.

The progress control unit 331 may transmit the created display data to the portable terminal 2 which requests the display data.

The progress control unit 331 may transmit various data of the player such as the player name, the attack capability, the HP, and the AP along with the display data for displaying the game screen 610 from the player table to the portable terminal 2 that requests the display data.

The progress control unit 331 may transmit various data such as the group name of the group to which the player belongs, the obtained DP, and the number of the owned AP recovery items along with the display data for displaying the game screen 610 from the group table to the portable terminal 2 that requests the display data.

The progress control unit 331 may transmit various data such as a start date/time and an end date/time of a game execution period including a current date/time, or a start date/time and an end date/time of a game execution period immediately after the current date/time, if there is no game execution period including the current date/time, along with the display data for displaying various screens from the match table to the portable terminal 2 that requests the display data.

If the progress control unit 331 receives the support action execution request transmitted from the portable terminal 2 via the server communication unit 31, the progress control unit 331 may execute a support execution process. First, the progress control unit 331 may extract a player ID included in the support action execution request and may specify the group ID of the group which may include an affiliated player corresponding to the extracted player ID with reference to the group table. Then, the progress control unit 331 may specify a group ID of the superior group which may include the subordinate group corresponding to the specified group ID. Then, the progress control unit 331 may increase the number of the owned AP recovery items associated with the group ID of the specified superior group by a predetermined number and may reduce the number of the owned AP recovery items associated with the group ID of the group which may include an affiliated player corresponding to the extracted player ID by a predetermined number. The progress control unit 331 may create the display data for displaying the support notification screen 1000 and the support result screen 1010 on the basis of a result of the support execution process.

The progress control unit 331 may transmit the display data for displaying the created support notification screen 1000 to the portable terminal 2 that may transmit the support action execution request and may transmit the display data for displaying the created support result screen 1010 to the portable terminal 2 of each player belonging to the superior group specified in the support execution process.

<Functions of Match Execution Unit 332>

If the match execution unit 332 of the server 3 receives the match action execution request transmitted from the portable terminal 2 via the server communication unit 31, the match execution unit 332 may execute a match execution process. First, the match execution unit 332 may determine the match action on the basis of a command included in the match action execution request. Then, the match execution unit 332 may determine a game result corresponding to the match action on the basis of the determined match action and changes the current HP and the current AP of each player belonging to the group executing the match and the obtained DP of the group executing the match, stored in the player table and the group table, on the basis of the determined game result. Note that, if the match action execution request includes the reduced number of the owned recovery items, the match execution unit 332 may change the number of the owned recovery items of the group executing the match, stored in the group table. In addition, the match execution unit 332 may create the display data for displaying the game screen 610 on the basis of the changed various data.

The match execution unit 332 may transmit the display data for displaying the game screen 610 created in the match execution process to the portable terminal 2 that may transmit the match action execution request via the server communication unit 31.

<Functions of Setting Unit 333>

If it is determined that the current date/time exceeds the end date/time of the game execution period by referring to the match table, the setting unit 333 of the server 3 may specify the match information associated with the game execution period of the end date/time which it has been determined exceeds the current date/time. The setting unit 333 may specify a set of group IDs for each match included in the specified match information and sets the group ID having the higher obtained DP out of a set of the group IDs for each match as a group ID of the winning group. In addition, the setting unit 333 may set the group ID having the lower obtained DP as a group ID of the losing group. Then, the setting unit 333 may extract a group ID included in the superior group IDs corresponding to the group ID of the losing group from the subordination table in order of the ranking in the subordinate group. Then, the setting unit 333 may rewrite the superior group ID associated with the group ID of the losing group in the subordination table with the group ID of the winning group. Then, the setting unit 333 may overwrite the rank in the subordinate group associated with the group ID of the losing group in the subordination table with a value obtained by adding the maximum value of the rank in the subordinate group of the wining group. In addition, the setting unit 333 may create display data for displaying the subordination rank screens 800 and 810 for the superior group for which the subordinate group may be newly created.

The setting unit 333 may transmit the display data created by the subordination setting process to the portable terminal 2 that may transmit the game screen request via the server communication unit 31.

<Functions of Control Unit 334>

If the control unit 334 of the server 3 receives a player ID and a receipt date/time from the progress control unit 331 and is instructed to execute a player control process, the control unit 334 may specify a group ID of the group which may include the received player ID as an affiliated player by referring to the group table. Then, the control unit 334 may determine whether or not the received receipt date/time is within any one of the game execution periods stored in the match table by referring to the match table.

Then, if the received receipt date/time is within any game execution period, the control unit 334 may specify a period ID associated with the game execution period which may include the received receipt date/time as an under-execution period ID. In addition, if the received receipt date/time is not within any one of the game execution periods, the control unit 334 may specify the period ID associated with the game execution period immediately after the received receipt date/time as a before-execution period ID.

Then, if the before-execution period ID is specified, and the specified group ID is included in the match information associated with the specified before-execution period ID stored in the match table, the control unit 334 may instruct the progress control unit 331 to create the display data for displaying the game intro screen 600. In addition, if the under-execution period ID is specified, and the specified group ID is included in the match information associated with the specified under-execution period ID stored in the match table, the control unit 334 may instruct the progress control unit 331 to create the display data for displaying the game screen 610.

Then, if the before-execution period ID is specified, and the specified group ID is included in the subordinate group stored in the subordination table, the control unit 334 may instruct the progress control unit 331 to create the display data for displaying the support screen 910. In addition, if the under-execution period ID is specified, and the specified group ID is included in the subordinate group stored in the subordination table, the control unit 334 may instruct the progress control unit 331 to create the display data for displaying the watching screen 900.

<Operation Sequence of Game System 1>

Figure 14:
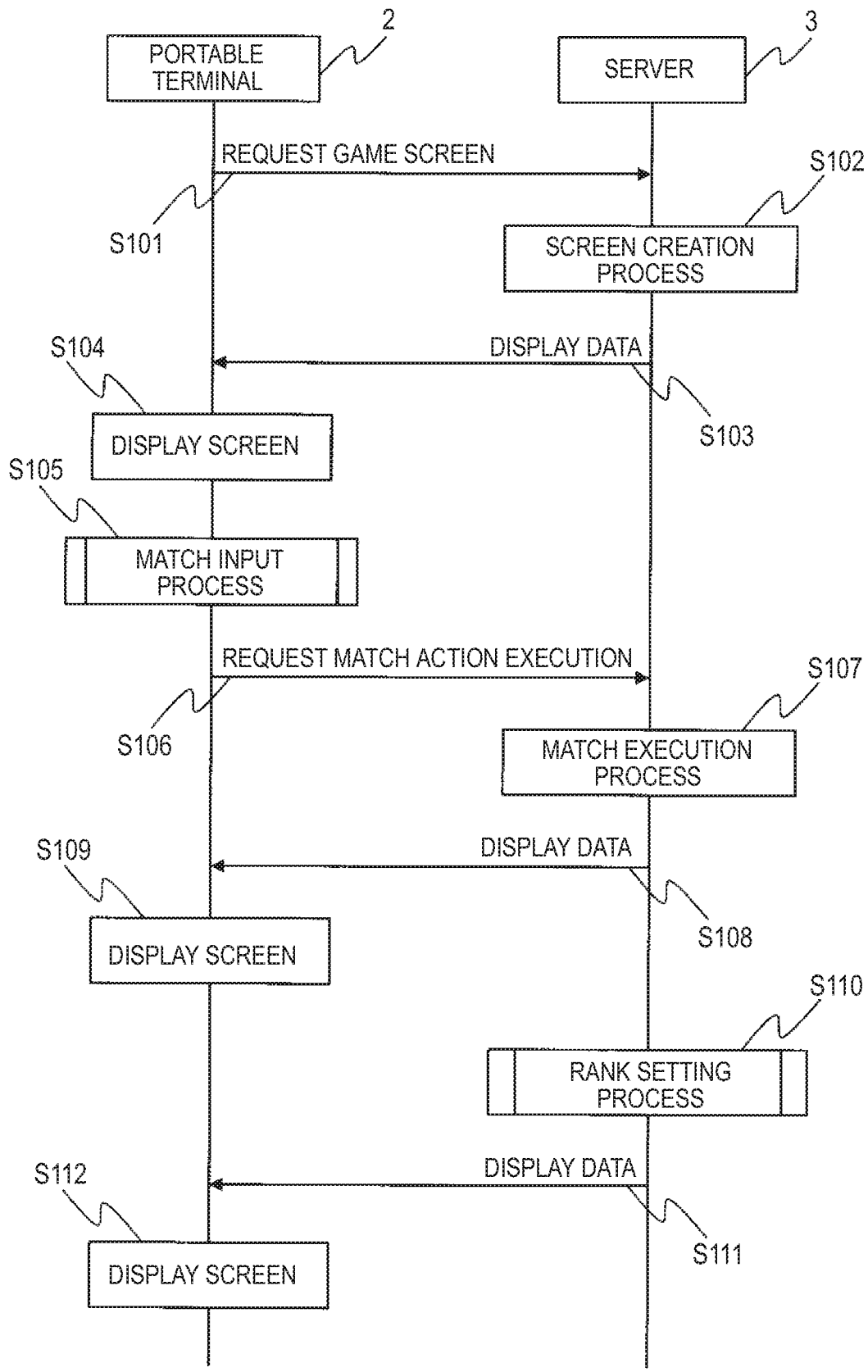
FIG. 14 is a diagram illustrating an exemplary operation sequence of the game system 1.

FIG. 14 may be a diagram illustrating an exemplary operation sequence of the game system 1. This operation sequence may be predominantly executed by the processing unit 25 and the server processing unit 33 in cooperation with each element of the portable terminal 2 and the server 3 on the basis of the program stored in the memory unit 22 and the server memory unit 32 in advance.

First, the input processing unit 252 of the portable terminal 2 of the player may transmit a game screen request for requesting the game screen to the server 3 via the communication unit 21 in response to a manipulation of the player on the input unit 23 (step S101).

Next, if the game screen request transmitted from the portable terminal 2 is received via the server communication unit 31, the progress control unit 331 and the control unit 334 of the server 3 may execute a screen creation process (step S102). In the screen creation process, if the receipt date/time at which the game screen request is received is before the game execution period, and the player ID included in the game screen request is included in the match information of the next game execution period, the progress control unit 331 and the control unit 334 may create the display data for displaying the game intro screen 600. In addition, in the screen creation process, if the receipt date/time at which the game screen request is received is within the game execution period, and the player ID included in the game screen request is included in the match information of the current game execution period, the progress control unit 331 may create the display data for displaying the game screen 610.

Then, the progress control unit 331 may transmit the display data for displaying the created game intro screen 600 or the game screen 610 to the portable terminal 2 that may transmit the game screen request via the server communication unit 31 (step S103).

Next, the display processing unit 251 of the portable terminal 2 may receive the display data transmitted from the server 3 via the communication unit 21 and may display the game intro screen 600 or the game screen 610 on the basis of the received display data (step S104).

Next, the display processing unit 251 and the input processing unit 252 of the portable terminal 2 may execute a match input process when the game screen 610 is displayed (step S105). Note that the match input process may be described below in more details.

Then, the input processing unit 252 may transmit the match action execution request created through the match input process to the server 3 via the communication unit 21 (step S106).

Then, if the match execution unit 332 of the server 3 may receive the match action execution request transmitted from the portable terminal 2 via the server communication unit 31, a match execution process may be executed (step S107).

Then, the match execution unit 332 may transmit the display data for displaying the game screen 610 created through the match execution process to the portable terminal that may have transmitted the match action execution request via the server communication unit 31 (step S108).

Then, the display processing unit 251 of the portable terminal 2 may receive the display data transmitted from the server 3 via the communication unit 21 and may display the game screen 610 on the basis of the received display data (step S109).

Then, the setting unit 333 of the server 3 may execute a subordination setting process depending on whether or not the current date/time exceeds the end date/time of the game execution period (step S110). Note that the subordination setting process may be described below in more details.

Then, the setting unit 333 may transmit the display data created through the subordination setting process to the portable terminal 2 that may have transmitted the game screen request via the server communication unit 31 (step S111).

Then, the display processing unit 251 of the portable terminal 2 may receive the display data transmitted from the server 3 via the communication unit 21 and may display the subordination rank screen 800 or 810 on the basis of the received display data (step S112).

<Match Input Process>

Figure 15:
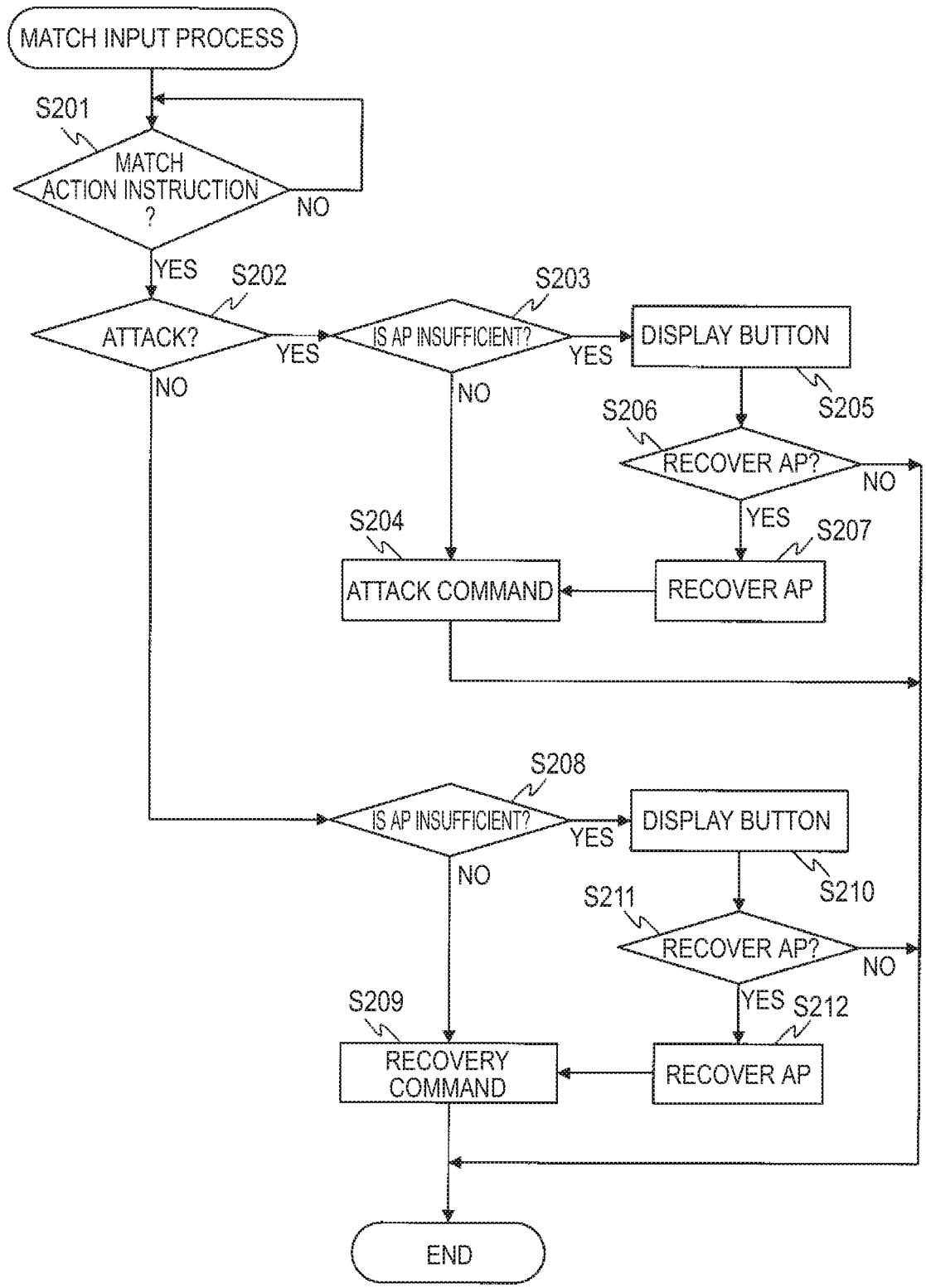
FIG. 15 is a diagram illustrating an exemplary operation flow of a match input process.

FIG. 15 may be a diagram illustrating an exemplary operation flow of the match input process performed by the display processing unit 251 and the input processing unit 252 of the portable terminal 2. The match input process of FIG. 15 may be executed in step S105 of FIG. 14.

First, the input processing unit 252 may determine whether or not the match action instruction button 619 displayed on the game screen 610 may be selected (step S201).

Then, if it is determined that the match action instruction button 619 displayed on the game screen 610 is not selected (NO in step S201), the input processing unit 252 may return the process to step S201 after a predetermined time elapses.

If it is determined that the match action instruction button 619 displayed on the game screen 610 has been selected (YES in step S201), the input processing unit 252 may determine whether or not the match action corresponding to the selected match action instruction button 619 is an attack match action (step S202).

Then, if it is determined that that attack match action is selected (YES in step S202), the input processing unit 252 may determine whether or not the AP necessary to execute the attack match action is higher than the AP of the player (step S203).

Then, if it is determined that the AP necessary to execute the attack match action is equal to or lower than the AP of the player (NO in step S203), the input processing unit 252 may create a match action execution request including an attack command representing that the match action is an attack (step S204) and terminates a series of steps.

If the input processing unit 252 determines that the AP necessary to execute the attack match action is higher than the AP of the player (YES in step S203), the display processing unit 251 may display the game screen 710 where at least the AP recovery button 712 may be displayed (step S205).

Then, the input processing unit 252 may determine whether or not the AP recovery button 712 displayed on the game screen 710 has been selected (step S206).

Then, if it is determined that the AP recovery button 712 displayed on the game screen 710 has not been selected (NO in step S206), the input processing unit 252 may terminate a series of steps.

If it is determined that the AP recovery button 712 displayed on the game screen 710 has been selected (YES in step S206), the input processing unit 252 may execute the AP recovery (step S207) and may terminate a series of steps by processing step S204.

If it is determined that the match action of the HP recovery is selected (NO in step S202), the input processing unit 252 may determine whether or not the AP necessary to execute the match action of the HP recovery is higher than the AP of the player (step S208).

Then, if it is determined that the AP necessary to execute the match action of the HP recovery is equal to or lower than the AP of the player (NO in step S208), the input processing unit 252 may create the match action execution request including the HP recovery command representing that the match action may be HP recovery (step S209) and may terminate a series of the steps.

If the input processing unit 252 determines that that the AP necessary to execute the match action of the HP recovery is higher than the AP of the player (YES in step S208), the display processing unit 251 may display the game screen 710 where at least the AP recovery button 712 may be displayed (step S210).

Then, the input processing unit 252 may determine whether or not the AP recovery button 712 displayed on the game screen 710 is selected (step S211).

Then, if it is determined that the AP recovery button 712 displayed on the game screen 710 is not selected (NO in step S211), the input processing unit 252 may terminate a series of the steps.

If it is determined that the AP recovery button 712 displayed on the game screen 710 is selected (YES in step S211), the input processing unit 252 may execute the AP recovery (step S207), and the process advances step S209, so that a series of the steps may be terminated.

<Subordination Setting Process>

Figure 16:
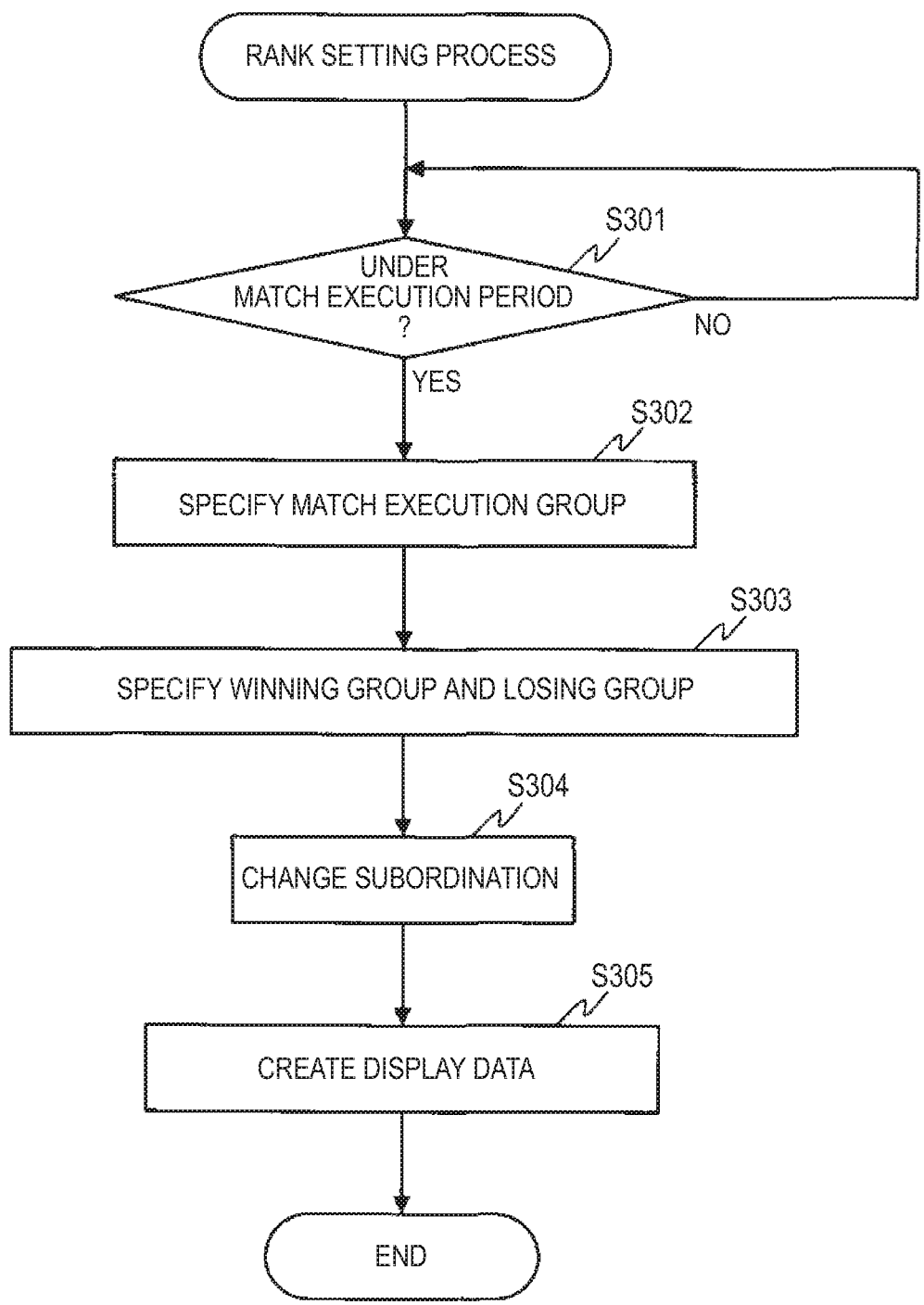
FIG. 16 is a diagram illustrating an exemplary operation flow of a subordination setting process.

FIG. 16 may be a diagram illustrating an exemplary operation flow of the subordination setting process using the setting unit 333 of the server 3. The subordination setting process of FIG. 16 may be executed in step S110 of FIG. 14.

First, the setting unit 333 may determine whether or not the current date/time exceeds the end date/time of the game execution period by referring to the match table (step S301).

Then, if it is determined that the current date/time does not exceed the end date/time of the game execution period (NO in step S301), the setting unit 333 returns the process to step S301 after a predetermined time elapses.

If it is determined that the current date/time exceeds the end date/time of the game execution period (YES in step S301), the setting unit 333 may specify a set of groups that have executed the match during the game execution period of the end date/time for which it may be determined that the current date/time exceeds (step S302).

Then, the setting unit 333 may specify a group losing against the winning group out of a set of the groups for each match on the basis of the obtained DP stored in the group table (step S303).

Then, the setting unit 333 may delete a record of the superior group having the group ID of the losing group from the subordination table and may include the group ID of the deleted superior group and the group ID of the subordinate group into the subordinate group associated with the group ID having the group ID of the winning group as the superior group (step S304).

The setting unit 333 may create display data for displaying the subordination rank screen 810 for the superior group having the newly created subordinate group (step S305) and may terminate a series of the steps.

<Operation Sequence of Game System 1>

Figure 17:
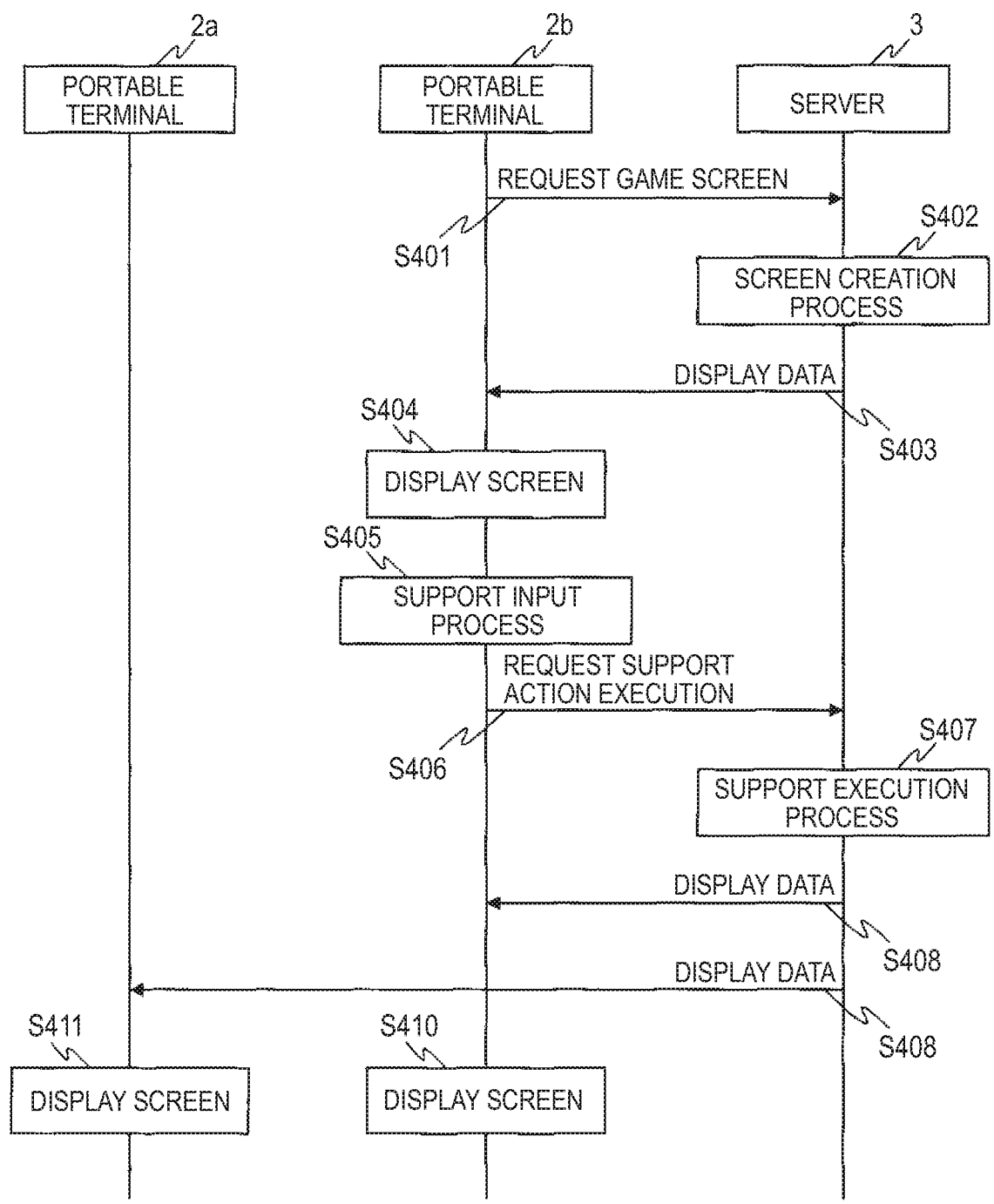
FIG. 17 is a diagram illustrating an exemplary operation sequence of the game system 1.

FIG. 17 may be a diagram illustrating an exemplary operation sequence of the game system 1. This operation sequence may be executed predominantly by the processing unit 25 and the server processing unit 33 on the basis of the program stored in the memory unit 22 and the server memory unit 32 in advance in cooperation with each element of the portable terminal and the server 3. Note that, in the operation sequence of FIG. 17, it may be assumed that the superior player may be owned by the portable terminal 2a, and the subordinate player may be owned by the portable terminal 2b.

First, the input processing unit 252 of the portable terminal 2b of the subordinate player may transmit a game screen request for requesting the game screen to the server via the communication unit 21 in response to a manipulation of the subordinate player on the input unit 23 (step S401).

Then, if the game screen request transmitted from the portable terminal 2 via the server communication unit 31 may be received, the progress control unit 331 and the control unit 334 of the server 3 may execute a screen creation process (step S402). In the screen creation process, if the receipt date/time at which the game screen request is received is prior to the game execution period, the progress control unit 331 and the control unit 334 create display data for displaying the support screen 910. In addition, in the screen creation process, if the receipt date/time at which the game screen request is received is within the game execution period, the progress control unit 331 may create display data for displaying the watching screen 900.

Then, the progress control unit 331 may transmit the display data for displaying the created watching screen 900 or the created support screen 910 to the portable terminal 2b that has transmitted the game screen request via the server communication unit 31 (step S403).

Then, the display processing unit 251 of the portable terminal 2b may receive the display data transmitted from the server 3 via the communication unit 21 and may display the watching screen 900 or the support screen 910 on the basis of the received display data (step S404).

Then, if the AP recovery item applying button 911 of the support screen 910 is pressed, the input processing unit 252 of the portable terminal 2b may execute a support input process for supporting creation of the support action execution request (step S405).

Then, the input processing unit 252 may transmit the support action execution request created through the support input process to the server 3 via the communication unit 21 (step S406).

Then, if the support action execution request transmitted from the portable terminal 2b via the server communication unit 31 is received, the progress control unit 331 of the server 3 may execute a support execution process (step S407).

Then, the progress control unit 331 may transmit the display data for displaying the support notification screen 1000 created through the support execution process to the portable terminal 2b that has transmitted the support action execution request (step S408).

The progress control unit 331 may transmit the display data for displaying the support result screen 1010 created through the support execution process to the portable terminal 2a of each player belonging to the superior group specified in the support execution process.

Then, the display processing unit 251 of the portable terminal 2b may receive the display data transmitted from the server 3 via the communication unit 21 and may display a support notification screen 1000 on the basis of the received display data (step S410).

Then, the display processing unit 251 of the portable terminal 2a may receive the display data transmitted from the server 3 via the communication unit 21 and may display the support result screen 1010 on the basis of the received display data (step S411).

As described above, the game system 1 implements the match execution function, the setting function, and the control function in the game for executing the match. Therefore, even a subordinate player not allowed to participate in the match can get involved in the game via a superior player allowed to participate in the match. As a result, it may be possible to improve an interest of the player in the game. Note that the match in the game between the players or the groups in the aforementioned description may not be limited to a one-to-one match. The match of the game may be a three-part match or a match in which three or more players or groups participate.

<First Modification>

Note that the progress control unit 331 of the server 3 may store the superior player in association with a first reward after the end date/time of the game execution period. In addition, the first reward stored in association with the superior player may change depending on the number of subordinate players belonging to the superior player. For example, if the superior player gets a reward having the higher value as the number of the subordinate players subordinate to the superior player increases, it may be possible to give rewards for the wins accumulated by the superior player in the game of the match and improve enjoyment of the game by the player.

A second reward corresponding to the subordination rank of the subordinate player or the subordination rank of the subordinate group to which the subordinate player belongs may be stored in association with each subordinate player after the end date/time of the game execution period. Note that the second reward may be a reward having a value lower than that of the first reward. For example, if the subordinate player gets a second reward having a higher value as the subordination rank of the subordinate player becomes higher (approaches the first rank), it may be possible to enhance motivation to support the subordinate player subordinate earlier and motivation of the subordinate player to participate in the game.

<Second Modification>

The support action may be limited within a predetermined range of the value set to be different for each subordination rank of the subordinate player. For example, the number of the given AP recovery items may be input within a predetermined range of a value that is set to be higher when the subordinate player has a higher subordination rank when the AP recovery item applying button 911 is selected. As a result, it may be possible to improve a contribution of support of a subordinate player to a superior player if the subordinate player supports the superior player for a longer period than other subordinate players. In addition, it may be possible to prevent the subordinate player who lost earlier from losing interest in the game.

<Third Modification>

The subordination rank of the subordinate player may change depending on execution of the support action by the subordinate player. For example, the progress control unit 331 of the server 3 may replace the subordination rank of the subordinate player having a higher frequency of the support action or a higher number of the given AP recovery items than that of the subordinate player that is immediately above them in rank, during a predetermined period (for example, ten minutes), with the subordination rank of the immediately higher-ranked subordinate player. Note that the progress control unit 331 may store the contribution depending on execution of the support action of the subordinate player in association with the subordinate player and store the contribution of the subordinate player or a third reward depending on the subordination rank and the contribution of the subordinate player in association with the subordinate player. For example, the progress control unit 331 may store contribution data depending on the frequency of the support action by the subordinate player for a predetermined period or the number of the given AP recovery items in association with the subordinate player. In addition, the progress control unit 331 may associate the contribution data associated with the subordinate player and/or the third reward corresponding to the subordination rank with the subordinate player. As a result, it may be possible to improve motivation of the player who intends to positively participate in the game even after the player loses in the game.

<Fourth Modification>

The input processing unit 252 of the portable terminal 2 may be allowed to execute the support action even during the game execution period. As a result, a subordinate player who watches the watching screen 900 can execute a support action at a timing desired to support the superior player. Therefore it may be possible to increase opportunities to involve the subordinate player in the game.

<Fifth Modification>

The support action may have a predetermined valid term. For example, assuming that the support action is an action for associating the AP recovery item with the superior player, the progress control unit 331 of the server 3 may execute the AP recovery such that this AP recovery item may be consumed within a valid term from an obtainment date/time at which the AP recovery item may be obtained from a particular event. As a result, the subordinate player may be more motivated to give the obtained AP recovery items to the superior player as soon as possible. Therefore, it may be possible to increase frequency that the subordinate player gets involved in the game. In addition, by allowing the superior player to use the given AP recovery items as soon as possible, it may be possible to improve frequency that the superior player participates in the game.

<Sixth Modification>

The superior player may execute both the support action of the superior player and the support action of the superior group to which the superior player belongs. For example, in a case where the support action is an action for associating the AP recovery time with the superior group, the superior player can strategically use the AP recovery items in consideration of a use status of the AP recovery items of other superior players.

<Seventh Modification>

A message exchange function may be provided between the superior player and the subordinate player to which the superior player belongs. That is, the progress control unit 331 of the server 3 may transmit display data for displaying a message screen (not shown) to exchange a message between the portable terminal 2a of the superior player and the portable terminal 2b of the subordinate player to which the superior player may be subordinate. In this case, the progress control unit 331 may set a larger allowable number of message transmission of the subordinate player, for example, as the subordination rank of the superior player is higher, so that a subordinate player who supports the superior player for a longer time can exchange a message with a higher possibility. In addition, the progress control unit 331 may create the display data for displaying each message screen such that a message screen display on the portable terminal 2a and a message screen displayed on the portable terminal 2b may be different. For example, the message screen displayed on the portable terminal 2a may include a screen for exchanging a message with all of the subordinate players or the subordinate players capable of exchanging the message and/or a screen for exchanging a message with other superior players. Meanwhile, the message screen displayed on the portable terminal 2a may include a screen for exchanging a message with the superior player. In this manner, in a case where a player who owns the portable terminal 2 may be a subordinate player, the subordinate player can concentrate on communication with the superior player by setting a limitation in the message exchange screen from the portable terminal 2 of the superior player. Therefore, it may be possible to improve a sense of unity between the superior player and the subordinate player in the game and improve motivation of the subordinate player who desires to support the superior player. Furthermore, after the rank setting process of step S110 is terminated, the progress control unit 331 may transmit display data for displaying a message screen for exchanging a message between the portable terminals 2a and 2b.

<Eighth Modification>

The game system 1 may allow only a subordinate player having a predetermined subordination rank or higher to participate in the match. As a result, in order to prevent the subordination rank from being lowered, it may be possible to improve motivation of the subordinate player who desires to support the superior player or motivation of the subordinate player who desires to have a higher subordination rank. In this case, a player who loses against the subordinate player participating in the match with a predetermined subordination rank or higher may be set as a subordinate player subordinate to the subordinate player who wins with a predetermined subordination rank or higher, and the subordinate player who wins with a predetermined subordination rank or higher may be set as a superior player of the losing player. Alternatively, a player who loses against the superior player may be set as a subordinate player subordinate to the subordinate player who may be allowed to participate in the match out of the subordinate players of the winning superior player. Alternatively, the game system 1 may allow a subordinate player having a predetermined subordination rank or higher to participate in the match only for a predetermined recovery time during the game execution period or a predetermined match. As a result, a period during which a subordinate player having a subordination rank lower than a predetermined rank may not be allowed to participate in the match can be limited to a predetermined recovery period or a predetermined match. Therefore, it may be possible to prevent dissatisfaction of the subordinate player with the game in advance.

<Ninth Modification>

Each function of the server processing unit 33 described above may be executed by the processing unit 25 of the portable terminal 2. In this case, if various tables are stored in the memory unit 22, it may not be necessary to perform communication with the server 3 whenever the process is performed. Instead, it may be possible to implement the aforementioned functions only using the portable terminal 2. In addition, the game executed by the portable terminal 2 may be a hybrid game in which each of the server 3 and the portable terminal 2 may be responsible for a part of the processes. In this case, for example, each game screen relating to a progress of the game may be displayed in a web view in which each game screen is displayed on the portable terminal 2 on the basis of the display data created by the server 3. In addition, other screens such as a menu screen may be displayed in a native view in which the screens may be displayed using a native application installed in the portable terminal 2.

<Tenth Modification>

The game system 1 may be provided with only a plurality of portable terminals 2 manipulated by each of a plurality of players. Each of the plurality of portable terminals 2 performs radio communication based on a radio communication method specified in the standard IEEE 802.11 so that an ad hoc network may be established by a plurality of portable terminals 2. In this case, a particular one of a plurality of portable terminals 2 may serve as a host to execute each function of the server 3 described above. Portable terminals other than the particular portable terminal 2 out of a plurality of portable terminals 2 may communicate with the particular portable terminal 2 that may execute each function of the server 3 to execute the aforementioned game. Note that the particular portable terminal 2 serving as a host may execute both each function of the server 3 and each function of the portable terminal 2.

A person ordinarily skilled in the art would appreciate that various may change, substitutions, or corrections may be possible without departing from the sprit and scope of the invention.

What is claimed is:

1. A computer program product embodied on a non-transitory computer-readable medium and containing instructions that, when executed, causes a game apparatus provided with a memory unit to provide a game to be executed between a plurality of groups to which a plurality of players belong, wherein causing the game apparatus to provide the game comprises:
   executing a control function to provide at least one match between the plurality of groups, the at least one match having at least one victorious group and at least one defeated group;
   executing a setting function, the setting function comprising setting an order of the plurality of groups according to a time of defeat associated with each defeated group in the plurality of groups, and providing a predetermined arrangement of the plurality of groups based on the order;
   displaying, on a display, the predetermined arrangement of the plurality of groups; and
   executing the control function to provide at least one further match between the plurality of groups based on the predetermined arrangement,
   wherein executing the control function comprises providing, to each player belonging to the plurality of groups, a controllable action, wherein each controllable action for each of the players in each of the plurality of groups is based on the order, and further comprises providing a controllable interface element configured to execute the controllable action, wherein executing the control function further comprises enabling and disabling the controllable action interface element based on an in-game timing.

2. The computer program product according to claim 1, wherein setting the order of the plurality of groups according to the time of defeat associated with each defeated group in the plurality of groups comprises setting groups with a later time of defeat to a lower part of the order.

3. The computer program product according to claim 1, wherein a plurality of controllable actions are provided, a first controllable action in the plurality of controllable actions being executable by each player in at least one predetermined group and not by each player in the at least one defeated group, and a second controllable action different from the first controllable action being executable by each player in the at least one defeated group and not by each player in the at least one predetermined group.

4. The computer program product according to claim 3, wherein a plurality of defeated groups is provided and wherein each of the plurality of groups is provided with a rank; and
   wherein the second controllable action different from the first controllable action is executable by each player in a lower-ranked defeated group in the at least one defeated group, the lower-ranked defeated group having a lower rank than a predetermined rank.

5. The computer program product according to claim 1, wherein each of the plurality of groups is provided with a rank; and
   wherein a controllable action in the plurality of controllable actions is executable by each player belonging to a group having a predetermined rank or a rank higher than a predetermined rank, and is not executable by each player belonging to a group having a rank lower than a predetermined rank.

6. The computer program product according to claim 1, wherein executing the control function comprises deducting at least one first point consumed in the game;
   further comprising executing a point storage function, comprising associating a set of second points with each of the plurality of groups, and storing a set of associated point values in the storage unit; and
   further comprising executing a point consumption function, comprising consuming at least one second point associated with a group in the plurality of groups and restoring at least one first point associated with the group in the plurality of groups based on the consumption of the at least one second point.

7. The computer program product according to claim 1, wherein each controllable action for each of the players comprises changing a parameter of at least one predetermined group based on the action.

8. The computer program product according to claim 7, wherein, for one or more players in the plurality of players in one or more groups in the plurality of groups, the step of changing a parameter of the at least one predetermined group based on the action comprises:
   associating at least one second point associated with the one or more groups with the at least one predetermined group; and
   removing an association for the at least one second point with the one or more groups.

9. The computer program product according to claim 8, wherein a magnitude of the at least one second point is based on the order.

10. The computer program product according to claim 8, wherein associating at least one second point with the at least one predetermined group further comprises associating the at least one second point with a valid term, wherein the at least one second point is configured to expire after an end of the valid term.

11. The computer program product according to claim 1, wherein causing the game apparatus to provide the game further comprises:
    executing a reward association function, wherein the reward association function comprises determining one or more ranks based on the order, and generating a set of different rewards, a first reward in the set of different rewards being associated with a first group and a first rank and a second reward in the set of predetermined rewards being associated with a second group and a second rank.

12. The computer program product according to claim 11, wherein the first reward is based on a number of groups associated with a first group.

13. The computer program product according to claim 1, wherein causing the game apparatus to provide the game further comprises:
    transmitting display data for displaying a message exchange screen, and providing, with the message exchange screen, a message exchange configured to transmit messages between each player belonging to a predetermined group and each player belonging to the at least one defeated group.

14. The computer program product according to claim 1, wherein causing the game apparatus to provide the game further comprises:
   determining a controllable action execution frequency of one or more players belonging to the plurality of groups; and
   adjusting a rank of the one or more players based on the controllable action execution frequency.

15. A method for controlling a game apparatus provided with a memory unit to provide a game to be executed between a plurality of groups to which a plurality of players belong, wherein the method comprises:
   executing a control function to provide at least one match between the plurality of groups, the at least one match having at least one victorious group and at least one defeated group;
   executing a setting function, the setting function comprising setting an order of the plurality of groups according to a time of defeat associated with each defeated group in the plurality of groups, and providing a predetermined arrangement of the plurality of groups based on the order;
   displaying, on a display, the predetermined arrangement of the plurality of groups; and
   executing the control function to provide at least one further match between the plurality,
   wherein executing the control function comprises providing, to each player belonging to the plurality of groups, a controllable action, wherein each controllable action for each of the players in each of the plurality of groups is based on the order, and further comprises providing a controllable interface element configured to execute the controllable action, wherein executing the control function further comprises enabling and disabling the controllable action interface element based on an in-game timing.

16. A game apparatus comprising a memory unit and configured to provide a game to be executed between a plurality of groups to which a plurality of players belong, wherein the game apparatus is configured to execute steps of:
   executing a control function to provide at least one match between the plurality of groups, the at least one match having at least one victorious group and at least one defeated group;
   executing a setting function, the setting function comprising setting an order of the plurality of groups according to a time of defeat associated with each defeated group in the plurality of groups, and providing a predetermined arrangement of the plurality of groups based on the order;
   displaying, on a display, the predetermined arrangement of the plurality of groups; and
   executing the control function to provide at least one further match between the plurality of groups based on the predetermined arrangement,
   wherein executing the control function comprises providing, to each player belonging to the plurality of groups, a controllable action, wherein each controllable action for each of the players in each of the plurality of groups is based on the order, and further comprises providing a controllable interface element configured to execute the controllable action, wherein executing the control function further comprises enabling and disabling the controllable action interface element based on an in-game timing.

* * * * *